US010310820B2

(12) United States Patent
Iscen

(10) Patent No.: US 10,310,820 B2
(45) Date of Patent: Jun. 4, 2019

(54) PROGRAMMING MODEL AND INTERPRETED RUNTIME ENVIRONMENT FOR HIGH PERFORMANCE SERVICES WITH IMPLICIT CONCURRENCY CONTROL

(71) Applicant: Basal Nuclei Inc., Seattle, WA (US)

(72) Inventor: Ahmet Salih Iscen, Seattle, WA (US)

(73) Assignee: Basal Nuclei Inc, Seattle, WA (US)

( * ) Notice: Subject to any disclaimer, the term of this patent is extended or adjusted under 35 U.S.C. 154(b) by 0 days.

(21) Appl. No.: 15/592,061

(22) Filed: May 10, 2017

(65) Prior Publication Data
US 2017/0329578 A1 Nov. 16, 2017

Related U.S. Application Data

(60) Provisional application No. 62/335,508, filed on May 12, 2016.

(51) Int. Cl.
G06F 9/44 (2018.01)
G06F 9/48 (2006.01)
G06F 8/30 (2018.01)
G06F 9/52 (2006.01)
G06F 9/448 (2018.01)
G06F 9/455 (2018.01)

(52) U.S. Cl.
CPC ............... *G06F 8/31* (2013.01); *G06F 8/315* (2013.01); *G06F 9/4482* (2018.02); *G06F 9/4488* (2018.02); *G06F 9/45508* (2013.01); *G06F 9/4831* (2013.01); *G06F 9/52* (2013.01)

(58) Field of Classification Search
CPC ................................ G06F 9/4831; G06F 8/31

USPC ......................................................... 717/114
See application file for complete search history.

(56) References Cited

U.S. PATENT DOCUMENTS

| 8,578,380 | B1* | 11/2013 | Adams | G06F 9/526 718/100 |
|---|---|---|---|---|
| 8,850,131 | B2* | 9/2014 | Chung | G06F 9/526 711/150 |
| 2003/0045952 | A1 | 3/2003 | Danan | |
| 2004/0093603 | A1 | 5/2004 | Alverson et al. | |
| 2005/0149936 | A1* | 7/2005 | Pilkington | G06F 9/3851 718/102 |
| 2005/0149937 | A1 | 7/2005 | Pilkington | |
| 2006/0075404 | A1* | 4/2006 | Rosu | G06F 9/4881 718/100 |
| 2007/0118836 | A1 | 5/2007 | Mensing | |

(Continued)

OTHER PUBLICATIONS

International Search Report and Written Opinion dated Aug. 22, 2017, issued in related International Application No. PCT/US2017/032249, 15 pages.

*Primary Examiner* — John Q Chavis
(74) *Attorney, Agent, or Firm* — Schwabe, Williamson & Wyatt, P.C.

(57) ABSTRACT

Disclosed is a programming model utilized for the definition of services to be operated on large sets of data with numerous responsibilities, the programming model comprising program units in a tree topology for high performance and implicit concurrency control, where each program unit definition comprises responsibilities defined in behaviors and configurations. A runtime environment may be utilized to provide implicit concurrency, parallelization, and concurrency control for operations executed on program unit instances.

24 Claims, 30 Drawing Sheets

(56) References Cited

U.S. PATENT DOCUMENTS

| | | | |
|---|---|---|---|
| 2010/0100689 A1* | 4/2010 | Dadiomov | G06F 9/466 711/151 |
| 2013/0055209 A1 | 2/2013 | Murthy | |
| 2013/0332711 A1* | 12/2013 | Leidel | G06F 9/30145 712/227 |
| 2014/0040219 A1* | 2/2014 | Kimura | G06F 9/524 707/704 |
| 2014/0040220 A1* | 2/2014 | Kimura | G06F 17/30171 707/704 |
| 2015/0347178 A1* | 12/2015 | Magee | G06F 9/4881 718/103 |

* cited by examiner

PROGRAMMING MODEL AND INTERPRETED RUNTIME ENVIRONMENT FOR HIGH PERFORMANCE SERVICES WITH IMPLICIT CONCURRENCY CONTROL

CROSS-REFERENCE TO RELATED APPLICATIONS

This application claims the benefit of and incorporates by this reference U.S. Provisional Patent Application Ser. No. 62/335,508, filed May 12, 2016.

BACKGROUND

In the real world, at any given time, many things are happen simultaneously. As more businesses and other organizations are transformed into digital form and more computers, including computers embedded in day-to-day appliances and devices (like cars, bicycles, clothes, coffee makers, etc.), are connected to the Internet or to private networks, it becomes more difficult to build high performance software services to address the increasing tendency for events to happen at the same time, including events should happen in a particular order. Events which happen in the "wrong" order or without regard to underlying logical or structural systems can create concurrency related hazards, such as if a person makes an appointment to be in two different places at the same time. Additional programming expertise and longer development time is generally required to deal with such concurrency related hazards in computer programs.

Historically, interpreted languages have been the choice to build software services. Interpreted languages give implementations some flexibility compared to compiled implementations and often make implementing programs easier. Building and executing interpreted programs may require an interpreted runtime environment (also referred to herein as runtime environment). The runtime environment comprises an interpreter, and may additionally comprise programming frameworks, network and other modules. A computer program interpreter (also referred to herein as "program interpreter" or "interpreter") is a computer program that performs instructions written in an interpreted language (e.g. Java or ECMAScript) without previously compiling them into a machine language program. Programming frameworks provide a variety of functions to the interpreted programs such as access storage or encryption of data. Network modules provide network client and network service functions to interpreted programs in order to support interoperable machine-to-machine interaction over a network; runtime environments with network modules give interpreted programs the capability to share data and resources, exposing functions and distributing work. Runtime environments provide network functions in order to solve the problems of the connected world.

It is easier and faster to build programs that do not run concurrently; in other words, it is easier to build programs with execution steps that simply run one after another, sequentially. However, sequential programs produce relatively low-throughput and high-latency especially when IO operations (e.g. operations that transfer data to or from a computer via network or to or from a disk drive, etc.) are involved. In concurrent computing, several computations and IO operations may be executed during overlapping time periods concurrently rather than sequentially, by either interleaving the execution steps on a single processor core or running the computations in parallel on multiple processor cores. Parallel computing, on the other hand, uses multiple processor cores simultaneously to execute a program for better performance and hardware utilization. Parallel and concurrent computing require additional expertise and use of explicit programming techniques to get programs to work correctly, to work without concurrency related hazards, and to perform with high-throughput and low-latency.

Some concurrent programming languages, some concurrency related extensions of existing programming languages, and some programming paradigms (e.g. event driven programming paradigm) enabled by some runtime environments may reduce latency and increase throughput of program execution with additional expertise; however, they do not offer a simple solution to the problems caused by demand for performing a high volume of simultaneous computations. Such programs still generally produce low-throughput, high-latency, and underutilize hardware. In addition, concurrency related problems can still arise due to simultaneous accesses by programs to shared resources.

Additional expertise may help solve concurrency related problems; however, for software systems that are constantly being built and extended, additional expertise may not bring easy solutions to concurrency related problems. Solving concurrency related problems may introduce other problems, including but not limited to bottlenecks, low-throughput, high-latency, and underutilization of processors.

DETAILED DESCRIPTION

Disclosed herein is an example of a programming model that may be used to build high performance services which, when executed by an interpreted runtime environment, provide implicit concurrency control.

In accordance with one aspect of the claimed subject matter, a programming model can be utilized for the definition of services to be operated on large sets of data with numerous responsibilities, comprising program units in a tree topology for high performance and implicit concurrency control, where each program unit definition comprises responsibilities defined in behaviors and configurations. In accordance with another aspect, a runtime environment may be utilized to provide implicit concurrency, parallelization, and concurrency control for operations executed on program unit instances. The program unit instances may comprise program unit instance creations, program unit instance deletions, and program unit instance behavior executions, where each program unit instance operates on a separate set of data.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Programming Model

Program Unit Definition

Figure 1:
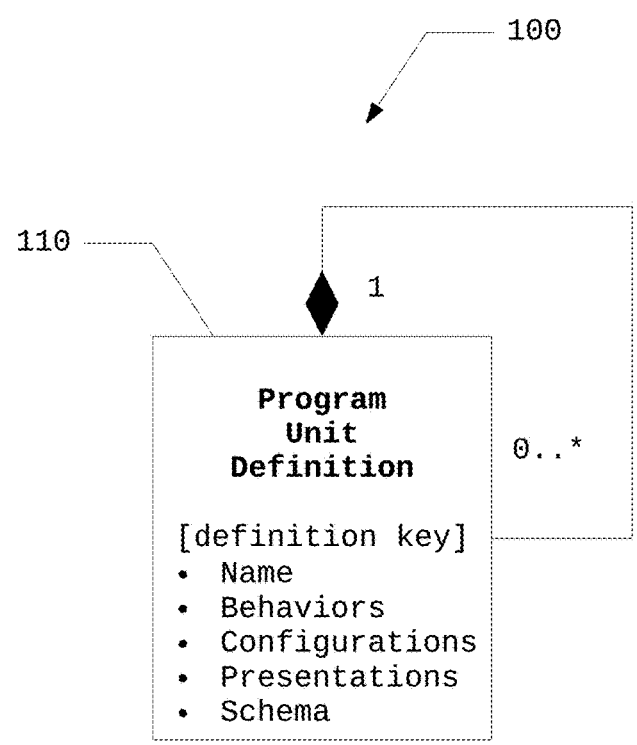
FIG. 1 is an example of a Unified Modeling Language ("UML") formatted diagram of service definitions as recursive compositions of interpreted computer program unit definitions in accordance with a programming model aspect of the claimed subject matter.

Referring initially to FIG. 1, illustrate is an embodiment of a service definition comprising program unit definitions in a tree structure represented in UML notation for composition 100 in accordance with a programming model aspect of the claimed subject matter. A root level program unit definition is a primary program unit definition and the descendants of the primary program unit definition are the auxiliary program unit definitions. An embodiment of an interpreted computer program unit definition 110 (also referred to herein as program unit definition or interpreted program unit definition) is identified with a unique definition key and comprises name, behavior, configuration, presentation, and data schema definitions. Behavior definitions are computer programs written in interpreted languages in direct style (DS) and continuation passing style (CPS) programming paradigms. Configuration definitions are information provided to the program that controls operational aspects at runtime including by not limited to security settings (e.g. roles, permissions etc.), concurrency control type (e.g. mutually exclusive, semaphore, readers-writers concurrency control, etc.), concurrency control settings (e.g. initial semaphore count), and default operational values etc. Presentation definitions include definitions regarding to how the program unit is presented and may include HTML files, CSS files client side JavaScript files, pictures, videos, among others. Data schema definitions are the skeleton structures that represents the logical view of the operational state of program units. Program unit definition keys may be assigned in advance by a programmer or through the use of an integrated development environment for each program definition. Program unit definition topology is created for each service definition by the programmer or through the use of an integrated development environment. Program unit definition topology is a tree topology where each tree node comprises the unit name and the unit definition key; unit names are unique among sibling nodes. Program unit definitions and the program unit definition topology are stored in a storage medium. Program definitions are made accessible to the runtime environment through the use of their unique definition key for operational purposes.

Program Unit Instance

An interpreted program unit instance exposes its behaviors and encapsulates its private operational data (also referred to herein as operational data) in a persisted form.

New program units can be instantiated via remote calls from other processes running on the same compute node, via remote calls through network (e.g. HTTP call), and via calls from interpreted program unit instances through the use of a programming framework provided with a runtime environment by conforming to the program unit definitions, program unit definition topology and the creational patterns of the program units.

Each created instance is assigned a unique instance key by the runtime environment.

Existing program unit instances can be deleted via remote calls from other processes running on the same compute node, via remote calls through network (e.g. HTTP call), and via calls from interpreted program unit instances through the use of a programming framework provided with a runtime environment.

Once a program unit is instantiated, its behaviors can be executed until it is deleted. Instance behaviors may be executed via remote calls from other processes running on the same compute node, via remote calls through network (e.g. HTTP call), and via calls from interpreted program unit instances through the use of a programming framework provided with the runtime environment.

Operational data of program unit instances are processed in system memory and persisted on storage mediums. Operational data of program unit instance comprises an instance key which is assigned to the instance during the instance creation to identify the program unit instance uniquely, a definition key which points to a program unit definition that is shared among all instances, a program unit instance topology which holds the list of the instance key values of the ancestor instances of the program unit instance from the root level instance to the immediate parent level instance, a system related information including security attributes, as well as an unordered collection of key/value pairs where the keys are strings, and an ordered list of zero or more values, each of which may be of any type as custom operational data. The custom operational data can be navigated, read, and manipulated by the program unit instances during program unit instance creation, program unit instance deletion, and program unit instance behavior execution, etc. The operational data of a program unit instance may be persisted on the same compute node where the interpreted computer program unit instance is executed or it may be located on another compute node. Additionally, the operational data of a program unit instance may be replicated on multiple compute nodes, for redundancy purposes for instance. Runtime environment enables program unit instances to be queried based on their operational data.

The program unit instances may also maintain other state in addition to their operational data that may require implicit concurrency control, such as a remote state stored in another service or computer system that is accessed with remote calls through network, or the state of an electrical switch (e.g. on/off) that is read and manipulated through device 10, or the state of an electric motor (e.g. its rotational speed and direction) that is read and manipulated through device 10, or the state of complicated machinery or systems accessed via various means, etc.

Singleton and Multiton Embodiment

Figure 2:
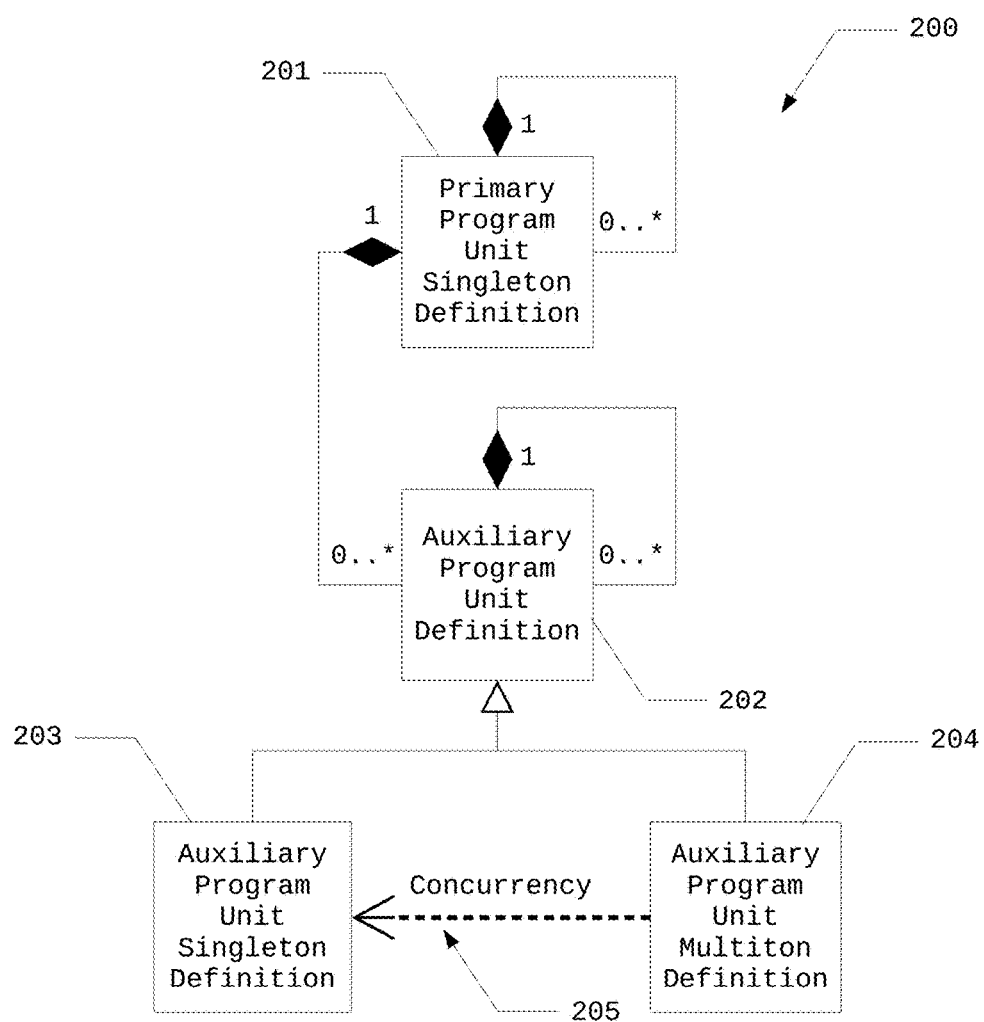
FIG. 2 is an example of a UML formatted diagram of service definitions as recursive compositions of primary program unit singleton definitions which are further recursive compositions of auxiliary program unit singleton and multiton definitions with collection level concurrency in accordance with a programming model aspect of the claimed subject matter.

An embodiment of program unit definitions incorporating the programming model aspect of the claimed subject matter with more advanced level of implicit concurrency control is shown in FIG. 2 in UML notation for composition and inheritance 200. Services can be composed of multiple primaries recursively 201 forming a tree of services. Similarly, auxiliary program units of each primary can be recursively composed of multiple auxiliaries 202 as well. A runtime environment can host multiple primaries. The preferred embodiment of the programming model uses singleton and multiton creational patterns to instantiate program units. The primary program unit 201 can only be a singleton; however, the auxiliary program units 202 can have both a singleton instance and numerous multiton instances. The auxiliary program unit singleton instances and the auxiliary program unit multiton instances are associated with their definition keys. The auxiliary program unit singleton instance and the auxiliary program unit multiton instances of the same auxiliary program unit have the same program unit definition key. A singleton instance have access to the singleton definitions 203 only, and multiton instances have access to the multiton definitions 204 only. Multiton instance collection of an auxiliary program unit may depend 205 on the singleton instance definition of the same auxiliary program unit for collection level implicit concurrency control. Auxiliary program unit singleton instances and auxiliary program unit multiton instances of the service instance are structured in distinct tree topologies where every distinct tree is a descendant subtree of the primary program unit singleton instance.

Figure 3:
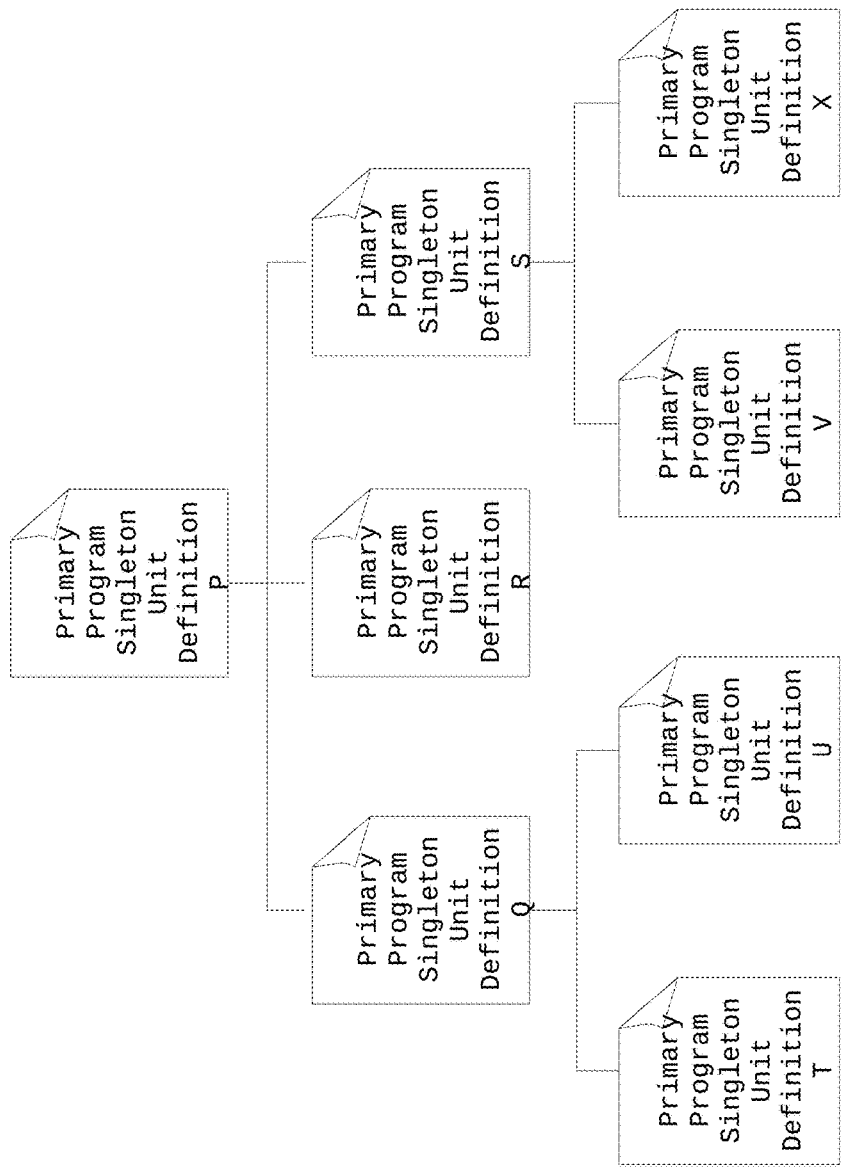
FIG. 3 is an exemplary primary program unit singleton definition tree of FIG. 2 in accordance with a programming model aspect of the claimed subject matter.

FIG. 3 is an exemplary primary program unit singleton definition tree of FIG. 2 in accordance with a programming model aspect of the claimed subject matter; a service is composed of multiple primary program units, recursively conforming to a tree structure.

Figure 4:
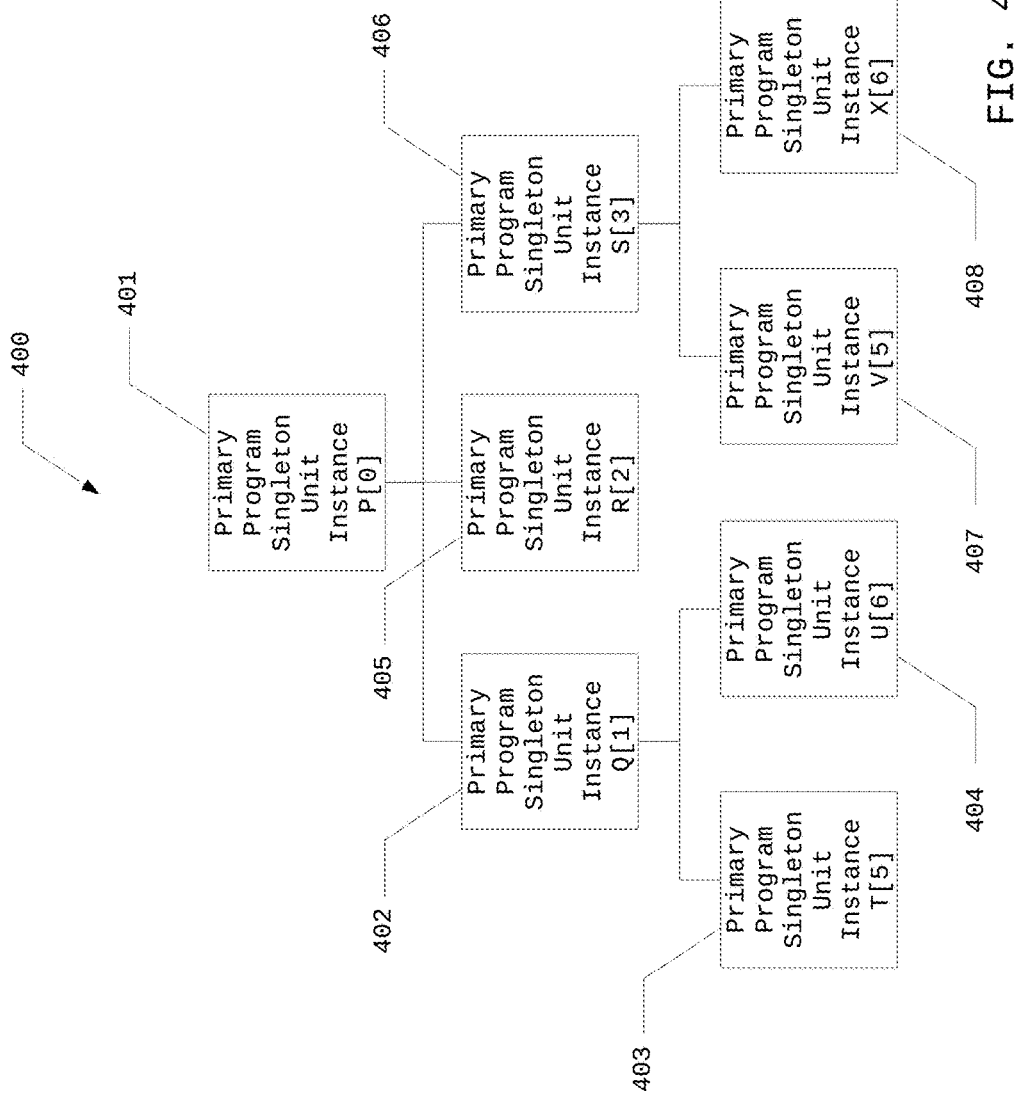
FIG. 4 is an exemplary primary program unit singleton instance tree of FIG. 3 in accordance with a programming model aspect of the claimed subject matter.

FIG. 4 shows an example instantiation of the example composition of a service definition as multiple primary program units 400 shown in FIG. 3. Multiple primaries in tree structure is particularly useful for building web services that provide sub services in a tree hierarchy. For example, where a domain name represents a main service (e.g. example.com 401), and the sub domains represent the sub services (e.g. travel.example.com 402) and address the descendant primary program unit singleton instances. For example:

i) Instance P[0]: example.com 401
  (a) Instance Q[1]: travel.example.com 402
    1. Instance T[5]: bedandbreakfest.travel.example.com 403
    2. Instance U[6]: localrides.travel.example.com 404
  (b) Instance R[2]: health.example.com 405
  (c) Instance S[3]: tickets.example.com 406
    1. Instance V[5]: movie.tickets.example.com 407
    2. Instance X[6]: concert.tickets.example.com 408

Figure 5:
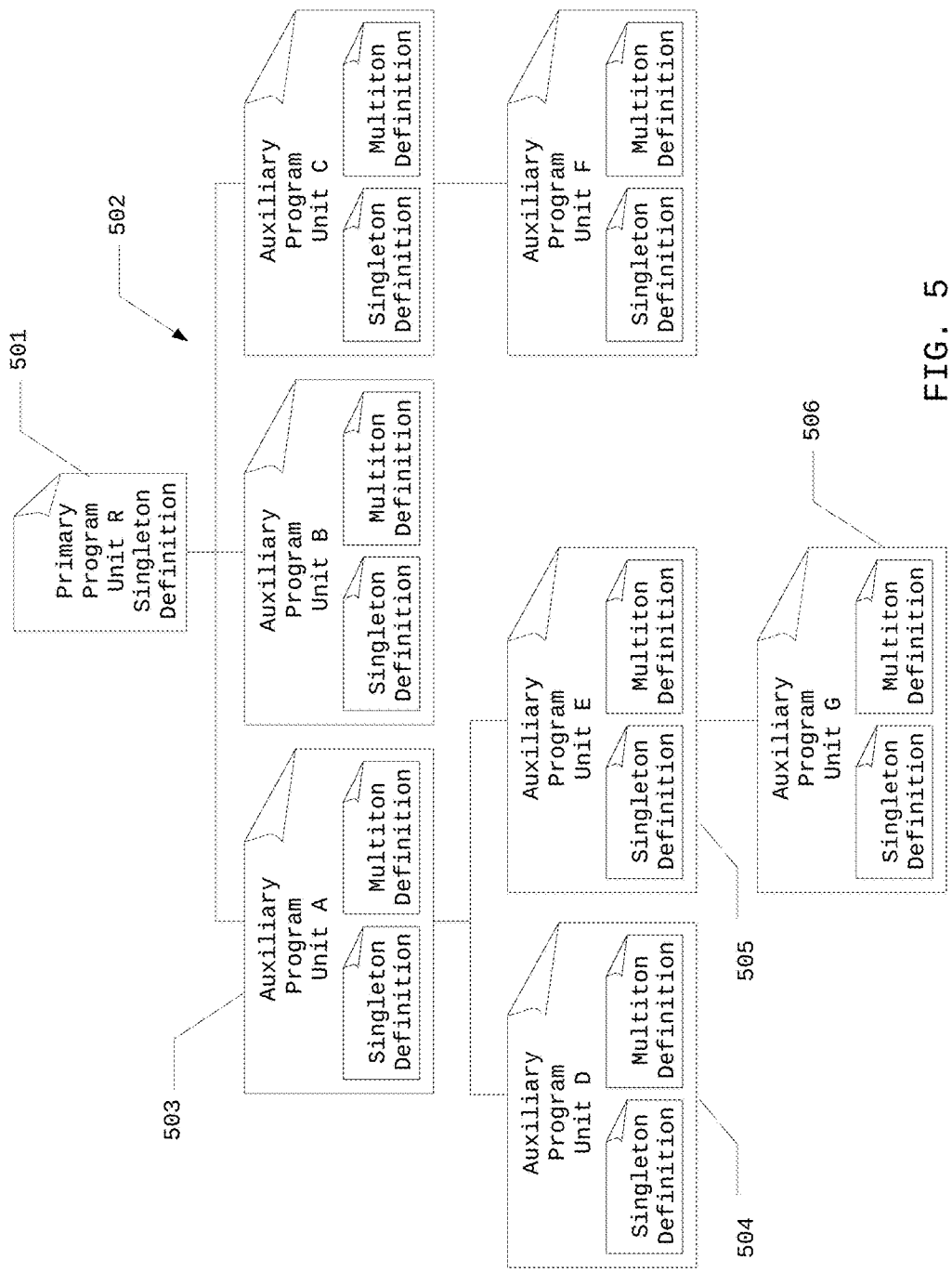
FIG. 5 is an exemplary auxiliary descendant program unit definition tree of a primary program unit singleton definition of FIG. 2 in accordance with a programming model aspect of the claimed subject matter.

FIG. 5 is an exemplary auxiliary descendant program unit definition tree of a primary program unit singleton definition of FIG. 2 in accordance with a programming model aspect of the claimed subject matter. The auxiliary descendant program unit definitions 502 of the primary program unit singleton definition 501 may have both singleton and multiton definitions. A web service example for auxiliary program unit multiton definition of a subtree may be:

i) Definition R: health.example.com 501
  (a) Definition A: Doctors 503
    1. Definition D: Reviews 544
    2. Definition E: Reservations 505
      i. Definition G: Tests 536

Figure 6:
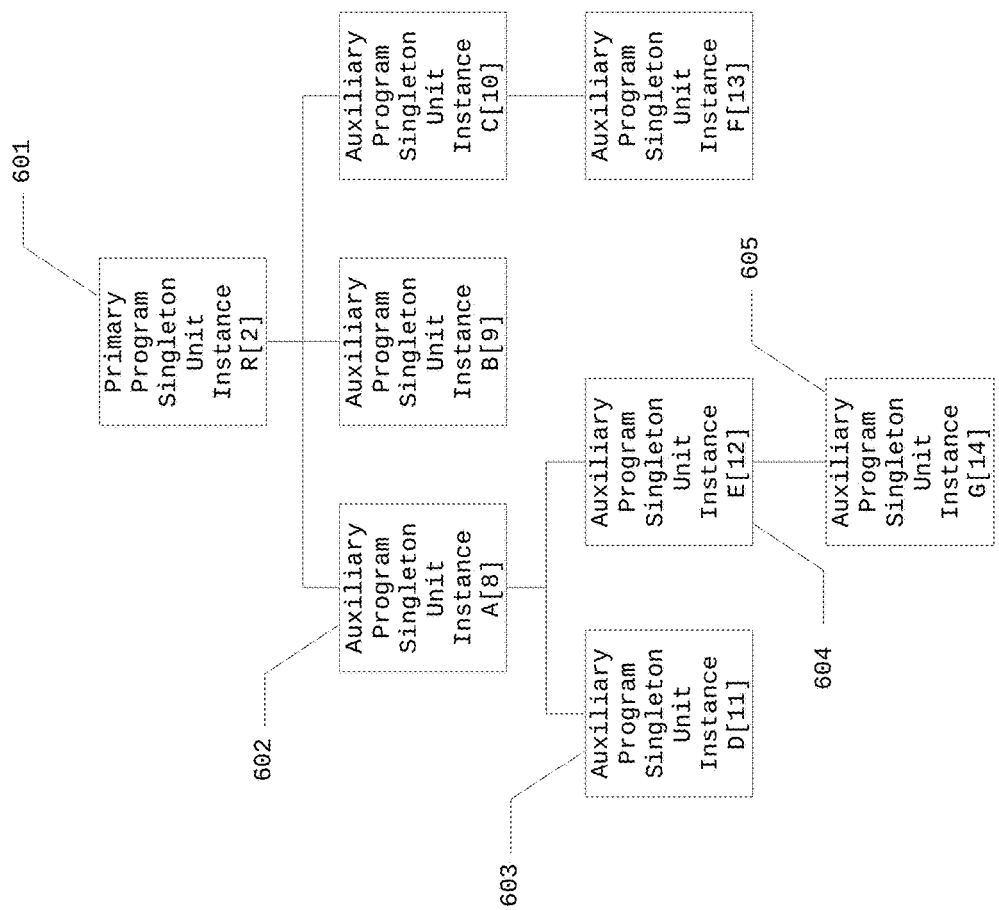
FIG. 6 is an exemplary descendant auxiliary program unit singleton instance tree of a primary program unit singleton instance of FIG. 5 in accordance with a programming model aspect of the claimed subject matter.

FIG. 6 shows an example instantiation of the auxiliary program unit singletons of the example composition of a service definition for one of the primary program unit compositions shown in FIG. 5. The primary program unit instance "R"[2] 601 may be addressed by the domain name of the web service, "health.example.com", and the auxiliary program unit singleton and multiton instances can be addressed in the URL. The following embodiment of URL form can be utilized to address the singleton instances, for instance:

i) Instance A[8]: "/Units/Doctors" 602
ii) Instance D[11]: "/Units/Doctors/Units/Reviews" 603
iii) Instance E[12]: "/Units/Doctors/Units/Reservations" 604
iv) Instance G[14]: "/Units/Doctors/Units/Reservations/Units/Tests" 605

Figure 7:
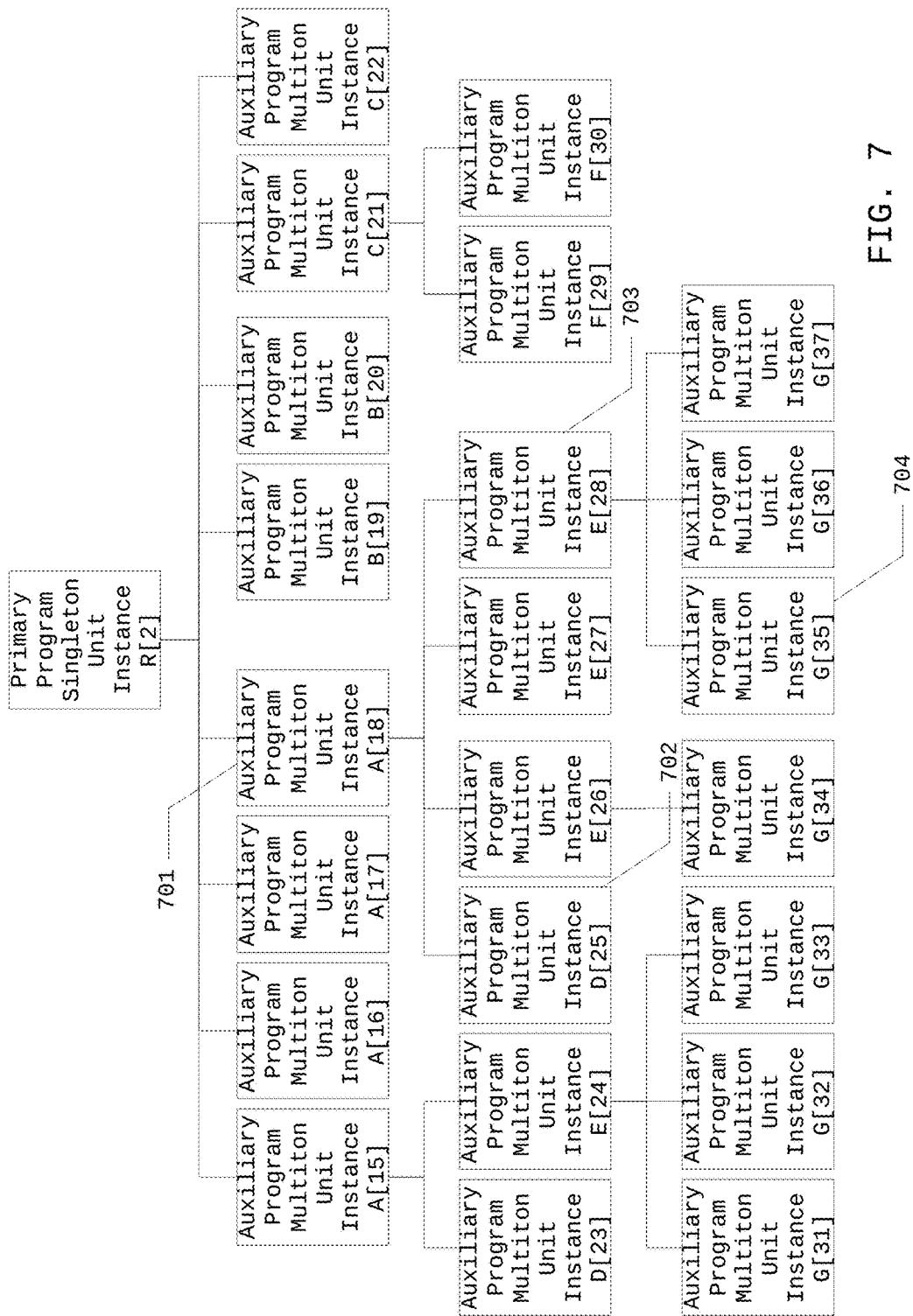
FIG. 7 is an exemplary descendant auxiliary program unit multiton instance tree of a primary program unit singleton instance of FIG. 5 in accordance with a programming model aspect of the claimed subject matter.

FIG. 7 shows an example instantiations of the auxiliary program unit multitons of the example composition of a service definition for one of the primary program unit compositions. The following embodiment of URL form may be utilized to address the multiton instances, for instance:

i) Instance A[18]: "/Units/Doctors/18" 701
ii) Instance D[25]: "/Units/Doctors/Units/Reviews/25" 702
iii) Instance E[28]: "/Units/Doctors/Units/Reservations/28" 703
iv) Instance G[35]: "/Units/Doctors/Units/Reservations/Units/Tests/35" 704

Program units may be operated using HTTP calls. For instance, a "Doctors" auxiliary program unit multiton may be instantiated by making a POST request to i) "/Units/Doctors"

URL with an additional payload, which may be executed by a default behavior defined on "Doctors" program unit singleton. Or, a custom "SendMessage" behavior defined on "Doctors" auxiliary program unit multiton can be called for a particular instance (e.g. 18) that has been instantiated with a prior POST call by making a POST request to i) "/Units/Doctors/18/SendMessage"

URL with an additional payload that contains the message.

Program units can also be operated by making calls to a programming framework provided with a runtime environment. For instance, a "Doctors" auxiliary program unit multiton can be instantiated by the following framework call:

i) "Units.Doctors.Add(input);"

which may be executed by a behavior defined on "Doctors" program unit singleton. Or, a custom "SendMessage" behavior defined on "Doctors" auxiliary program unit multiton can be called for a particular instance (e.g. 18) that has been instantiated with a previous framework call:

i) "Units.Doctors.Get(18).SendMessage(message)"

Concurrency

The runtime environment aspect of the subject matter provides implicit concurrency control mechanisms to operations executed on program unit instances including but not limited to program unit instance creations, program unit instance deletions, and program unit instance behavior executions.

A separate implicit concurrency control instance is managed for each program unit instance; executions of operations on the same program unit instance are subject to the same concurrency control instance; executions of operations on different program unit instances are each subject to different concurrency control instances. For instance, the simultaneous executions of operations on the same program unit instance, where each operation updates the operational state of the program unit instance, can never overlap. Executions of operations on different program unit instances are subject to be executed concurrently.

The implicit concurrency control provided for an individual program unit instance can be augmented to provide implicit concurrency control to multiple program unit instances with the utilization of program unit behaviors executed on the individual program unit instance operating on multiple program unit instances.

Concurrency by Parent

The implicit concurrency control instance of a program unit instance can be extended to its descendant program unit instances with the utilization of the program unit behaviors operating on the program unit instance tree where the program unit instance itself is at the root of the tree.

For instance, a behavior in a parent program unit can be defined to ensure only zero or one descendant program unit instance may exist based on a particular state of the descendant program unit instances. Similarly, a behavior in a parent program unit can be defined to ensure the number of descendant program unit instances does not exceed a certain number. Providing implicit concurrency control mechanism from a parent program unit instance to its descendent program unit instances is not limited to immediate descendant instances, implicit concurrency control mechanism can be provided to the entire tree of descendants or to a part of the tree of descendants of a parent program unit instance.

An embodiment of providing implicit concurrency control mechanism from a parent program unit instance is accomplished by the utilization of program unit instance topology. Program unit instance topology is an operational data of program unit instances that comprises information to enable a parent program unit instance to query its immediate descendant program units, its entire descendant program units, or its descendant program units in or within a particular distance to the parent program unit instance. An embodiment of program unit instance topology for the auxiliary program unit multiton instance G[35] 704 shown in FIG. 7 can be represented in JSON as follows:

```
i) "Topology" : {
    (a) "0" : {
        1. "definitionKey" : "R",
        2. "instanceKey" : "2"
    (b) },
    (c) "1" : {
        1. "definitionKey" : "A",
        2. "instanceKey" : "15"
    (d) },
    (e) "2" : {
        1. "definitionKey" : "E",
        2. "instanceKey" : "24"
    (f) },
    (g) "3" : {
        1. "definitionKey" : "G",
        2. "instanceKey" : "33"
    (h) }
ii) }
```

The key values of the members of the "Topology" JSON object are numbers that represent the distance of the program unit instance from the root level primary program unit instance.

For instance, using the program unit instance topology attribute of the program unit instances, the primary program unit instance R[2] can provide implicit concurrency control to its descendants of "G" type (i.e. definitionKey value path is "R/A/E/G"), or it can provide implicit concurrency control to its descendants up to level 2 (i.e. key value of the member of the "Topology" JSON object is "2"), or it can provide implicit concurrency control to all of its descendants.

The instance topology attribute of each program unit instance is set during their creation by the runtime environment. During the creation of a program unit instance, the runtime environment reads the instance topology attribute JSON object of the parent program unit instance of the program unit instance being created, extends it with a new member that contains the "definitionKey" and the "instanceKey" values of the parent program unit instance, and saves it as the instance topology attribute of the instance being created. The key value of the new entry represents the distance of the parent program unit instance from the root level primary program unit instance.

Singleton/Multiton Concurrency

The implicit concurrency control instance of an auxiliary program unit singleton instance can be extended to the collection of the auxiliary program unit multiton instances of the same auxiliary program unit with the utilization of the behaviors of the auxiliary program unit singleton instance operating on the auxiliary program unit multiton instances.

Figure 8:
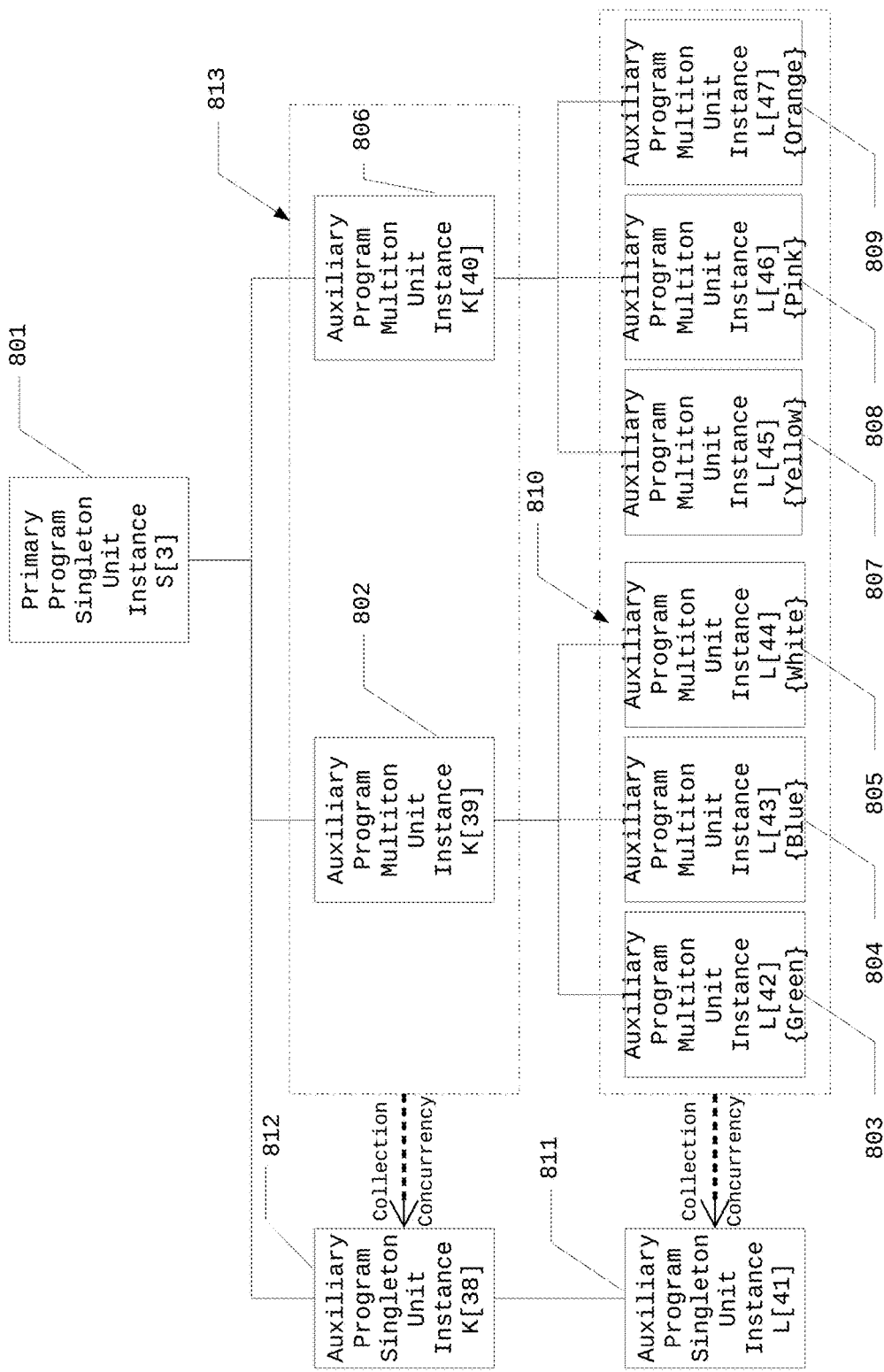
FIG. 8 is an exemplary program unit instance tree of FIG. 5 illustrating collection level concurrency controls provided by auxiliary program unit singleton instances to their auxiliary program unit multiton instance collections in accordance with a programming model aspect of the claimed subject matter.

In the example shown in FIG. 8, the auxiliary program unit multiton instance K[39] 802 can provide implicit concurrency control to its descendant auxiliary program unit multiton L instances L[42] 803, L[43] 804, and L[44] 805, similarly auxiliary program unit multiton instance K[40] 806 can provide implicit concurrency control to its descendant auxiliary program unit multiton L instances L[45] 807, L[46] 808, and L[47] 809. However, neither of these multiton instances can provide implicit concurrency control to the entire L collection 810; for instance, neither of K[39] 802 or K[40] 806 can ensure that only zero or one auxiliary program unit multiton L instance can exist with a certain operational state, color value for instance, among all L collection instances 810. Primary program unit singleton instance 801 can provide implicit concurrency control to auxiliary program unit multiton L collection 810, however, providing implicit concurrency control for every auxiliary program unit multiton instance collection at the primary unit singleton instance 801 introduces a serious performance bottleneck. Auxiliary program unit singleton instances are utilized to provide implicit concurrency control to the multiton instance collection of their auxiliary program units. This way the single point of concurrency control for multiton collections can be distributed from primary unit singleton instance to auxiliary program unit singleton instances. For instance, the auxiliary program unit singleton instance L[41] 811 can provide implicit concurrency control to the entire auxiliary program unit multiton collection L 810, and the auxiliary program unit singleton instance K[38] 812 can provide implicit concurrency control to the entire auxiliary program unit multiton collection K 813 in separate concurrency control instances. Nonetheless L[41] 811, and K[38] 812 can also provide implicit concurrency control to their instances L[41] 811 and K[38] 812 respectively as well.

For instance, for the "health.example.com" example given above, a behavior defined on "Doctors" auxiliary program unit multiton can provide concurrency control for the creation of "Reservations" auxiliary program unit multiton instances for each "Doctors" auxiliary program unit multiton instance in order to prevent double reservations at the same date and time for each doctor. The behavior may query the "Reservations" auxiliary program unit multiton instances of the "Doctors" auxiliary program unit multiton instance for the given date and time in order to create a new "Reservation" auxiliary program unit multiton instance, only if there is no "Reservations" auxiliary program unit multiton instance created for the given date and time for the "Doctors" auxiliary program unit multiton instance already. If there happens multiple simultaneous requests by multiple patients to the same doctor to make reservations at the same date and time, the concurrency control provided by the "Doctors" auxiliary program unit multiton instance will handle creation requests in serial manner, if the first request creates a reservation for a given date and time, the second one will fail to prevent creation of multiple reservations for the same date and time for the doctor.

A behavior defined on "Doctors" auxiliary program unit multiton can only provide concurrency control to creation of descendant "Reservations" auxiliary program unit multiton instances for each "Doctors" auxiliary program unit multiton instance separately. Nonetheless, a behavior defined on "Doctors" auxiliary program unit singleton can provide concurrency control for the creation of "Reservations" program unit multiton instances in order to prevent double reservations at the same date and time for a given patient identified by a patient id for any doctor. The behavior defined on "Doctors" auxiliary program unit singleton may query the entire "Reservations" auxiliary program unit multiton instances for a given patient id, data and time, only to create a new "Reservations" auxiliary program unit multiton instance if there is no "Reservations" auxiliary program unit multiton instance created for the given patient at the given date and time. If there happens multiple simultaneous requests by the same patient to make reservations for different doctors at the same date and time, the concurrency control provided by the "Doctors" auxiliary program unit singleton instance will handle requests in serial manner, if the first request creates a reservation for a given patient, date and time, then the second one will fail to prevent multiple reservations for the given patient at the same date and time for different doctors.

Runtime Environment

Figure 9:
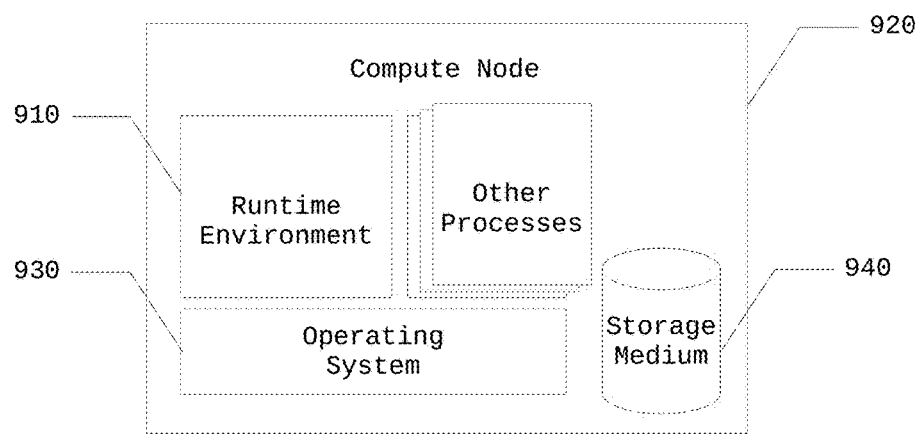
FIG. 9 is an example of a schematic block diagram illustrating a suitable operating environment of the runtime environment in accordance with a runtime environment aspect of the claimed subject matter.

FIG. 9 is a schematic block diagram illustrating a suitable operating environment of the runtime environment in accordance with a runtime environment aspect of the claimed subject matter. Runtime environment 910 runs on a compute node 920 as a process. Compute node 920 can be a physical machine, a virtual machine or a container. Compute node 920 runs an operating system 930 such as Linux or Windows and has a storage medium 940. Runtime environment 910 may provide network functions, storage functions and interpreted program execution functions, among others. Network functions may provide, for example, communication in network protocols including but not limited to TCP/IP, HTTP, HTTPS, and ambient protocols (e.g. bluetooth, zigbee etc). Runtime environment 910 can be deployed on multiple single computers to build and operate applications that give ambient services in networked and collaborative manner for near-edge or fog computing purposes, or can it be distributed on compute nodes in a data center environment using shared nothing architecture, where none of the nodes share storage medium or memory for scalability.

Fabric

Fabric is a set of threads where each fabric thread provides identical fabric functions in parallel. Fabrics do not share threads. Fabric threads of a runtime environment collaborate with each other by communicating asynchronously using memory bound task objects. The minimum number of threads in any fabric is one. The runtime environment scales vertically on a compute node that has more hardware resources (e.g. number of processing cores, memory, storage space) by allocating more number of threads in its fabrics.

In an embodiment of the subject matter, the runtime environment comprises an execution fabric, a network fabric, and a storage fabric. The execution fabric runs the main functions of the runtime environment including interpreted program (e.g ECMAScript) execution and other functions that maintain the runtime environment. Network fabric runs the network functions of the runtime environment and may communicate in multiple protocols. Storage fabric runs the storage functions of the runtime environment in order to accomplish the system and the user defined storage requirements.

An embodiment of a runtime environment may comprise an IO fabric that collects ambient sensor readings, controls step motors, a robotic arm, or other machinery.

Fabric Thread

Figure 10:
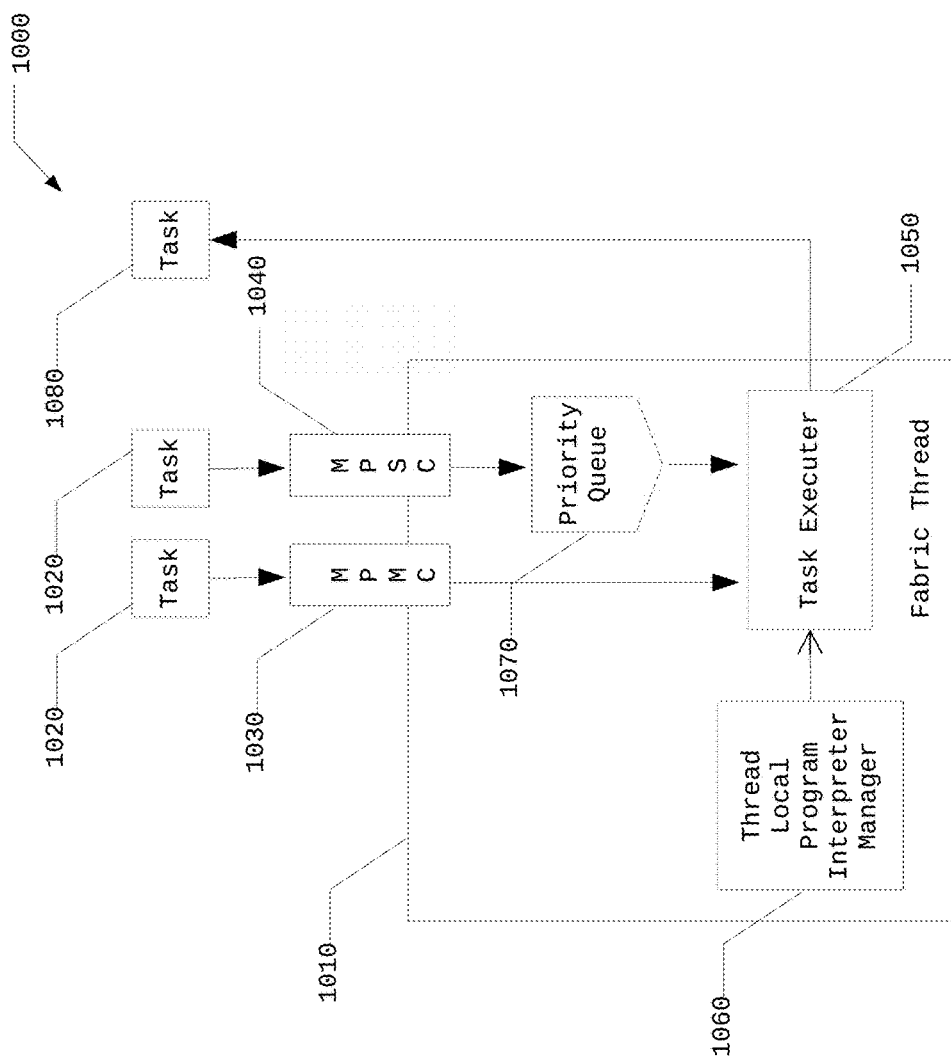
FIG. 10 is a block diagram of an example of a fabric thread in accordance with a runtime environment aspect of the claimed subject matter.

FIG. 10 is a block diagram of fabric thread and tasks 1000 in accordance with a runtime environment aspect of the claimed subject matter. The main duty of fabric thread 1010 (also referred to herein as a thread) is to execute the incoming tasks 1020 received through its high performance task queues. High performance task queues of fabric threads are shared multiple producer multiple consumer high performance task queue 1030 (also referred to herein as shared task queue), and private multiple producer single consumer high performance task queue 1040 (also referred to herein as private task queue). A fabric thread comprises at least one high performance task queue. Every fabric thread comprises a task executor 1050. Execution fabric thread additionally comprises a thread local program interpreter manager 1060. Depending on the fabric type, a fabric thread may also comprise a priority queue 1070. Thread local program interpreter manager 1060 is responsible for providing isolated interpreted program execution contexts to tasks. Isolated execution contexts enable each interpreted program to execute in their private execution environment. During the execution of the interpreted programs the execution control may be passed back and forth between the interpreted program and the task executer 1050 in order to provide runtime environment system level functions to the interpreted programs, including but not limited to yielding execution, scheduling outgoing tasks 1080 for concurrent execution on fabric threads, calling a framework function compiled into machine language. Parallelization is provided by assigning threads to run on separate processing cores.

Task

Task is a memory bound object that conveys the behavior to be executed and the set of properties to be processed by the fabric thread in accordance with a runtime environment aspect of the claimed subject matter.

Task behavior is either a native behavior or a mix of native and managed behavior. Native behaviors are compiled into machine language and provided with the runtime environment. Managed behaviors are interpreted programs defined in interpreted languages. If the managed behavior of a task is given in an interpreted language as source code, then the task compiles it into interpreted computer program before it executes it. Every task has at least one behavior definition and may have both native and managed behaviors at the same time. Task behaviors are executed in fabric threads. Task behavior execution is also referred to herein as task execution.

Task property may be a primitive data type or a composite data type. Task properties include a task key, a task priority, task execution arguments among others.

Task key is a string value that uniquely identifies the task. The runtime environment aspect of the subject matter uses task key values to route the tasks to the fabric threads of the execution fabric; tasks that have the same task key value are always executed in the same execution fabric thread per runtime environment, nevertheless, tasks that have different key values may be executed in different execution fabric threads which provide concurrency and parallelization to task executions. Tasks that are executing operations on program unit instances derive their key values from the instance key values of the program unit instances. Program unit instance key values are uniquely generated by the runtime environment.

Task priority is a natural number that represents the priority of the task. Tasks are executed based on their task priority values in the execution fabric. For example, smaller values may take precedence over bigger values; for example, 0 maybe the highest task priority value.

There are 2 types of task priority levels; system level priorities, and user level priorities. System level priorities take precedence over user level priorities. There are a predefined finite number of system level priority values starting from 0. User level priority values start after system level priority values and may be monotonically increased, if not strictly increased, for each task that is assigned a user level priority value at execution fabric. Execution fabric maintains a monotonically increasing clock value, if not strictly increasing clock value, to assign user level priority values. Tasks are subject to be reprioritized.

System Task

Tasks with system level priority values are system tasks. System tasks communicate with the runtime environment for access to the runtime environment resources such as storage and network. Example usages of system tasks are executing an IO operation, shutting down a fabric thread, etc.

User Task

Tasks with user level priority values are user tasks. User tasks execute the operations on program unit instances including but not limited to program unit instance creations, program unit instance deletions, and program unit instance behavior executions. Runtime environment provides user tasks the necessary engine functions to execute the managed behaviors including but not limited to reading, preprocessing, and transpiling (source-to-source compiling) the source code provided in an interpreted language, compiling the source code into interpreted computer program, and performing the interpretation. Execution of user tasks may require transitioning from native mode to managed mode and managed mode to native mode. This transitioning process is also provided by the runtime environment.

Private Queue

Figure 11:
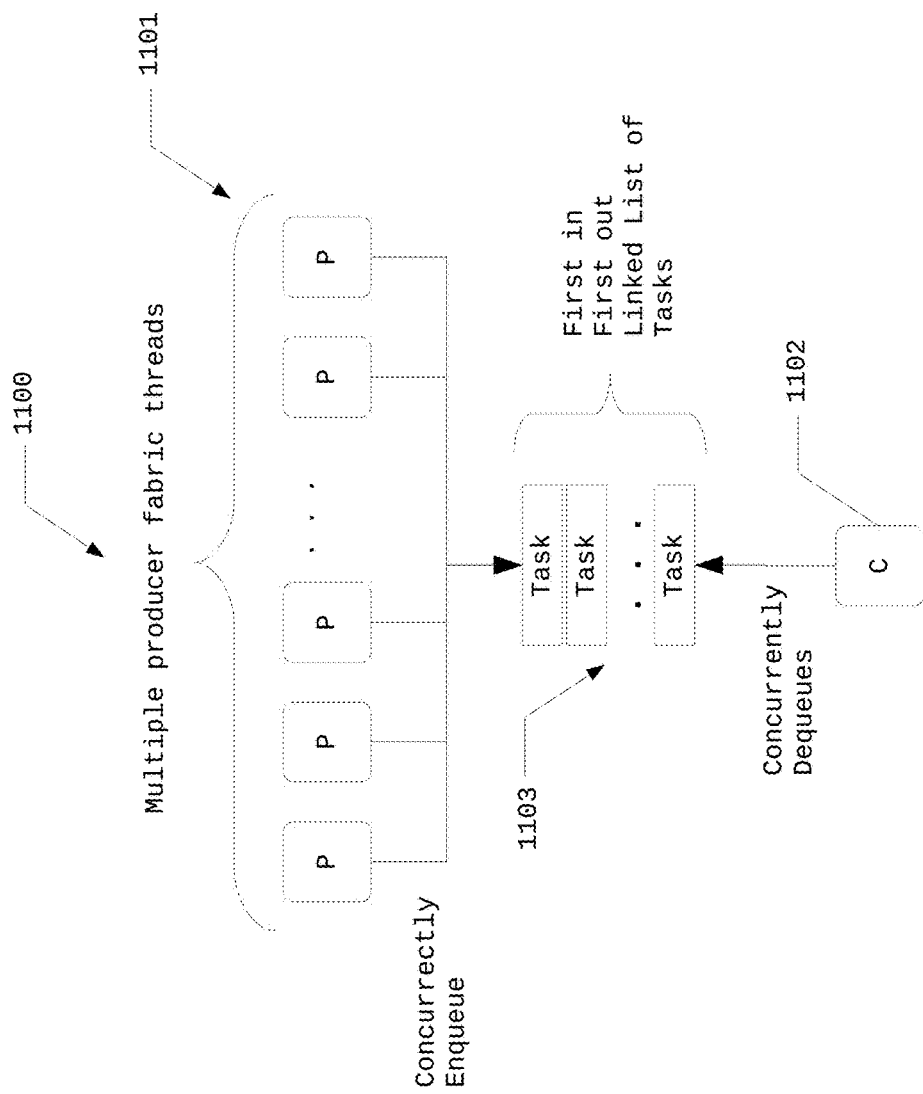
FIG. 11 is a block diagram illustrating an example of a private multiple producer single consumer task queue in accordance with a runtime environment aspect of the claimed subject matter.

FIG. 11 is a block diagram illustrating a private multiple producer single consumer task queue 1100 in accordance with a runtime environment aspect of the claimed subject matter. Private task queues are multiple producer single consumer task queues for concurrently enqueuing tasks from multiple producer threads 1101, and concurrently dequeuing them from a single consumer thread 1102. Producer fabric threads 1101 address a particular fabric thread when they enqueue a task into a private task queue. Concurrently enqueued tasks are stored in a linked list data structure 1103 in first in first out manner that is privately owned by a single consumer fabric thread. The consumer fabric thread concurrently dequeues the enqueued tasks from its private task queue for execution.

Shared Queue

Figure 12:
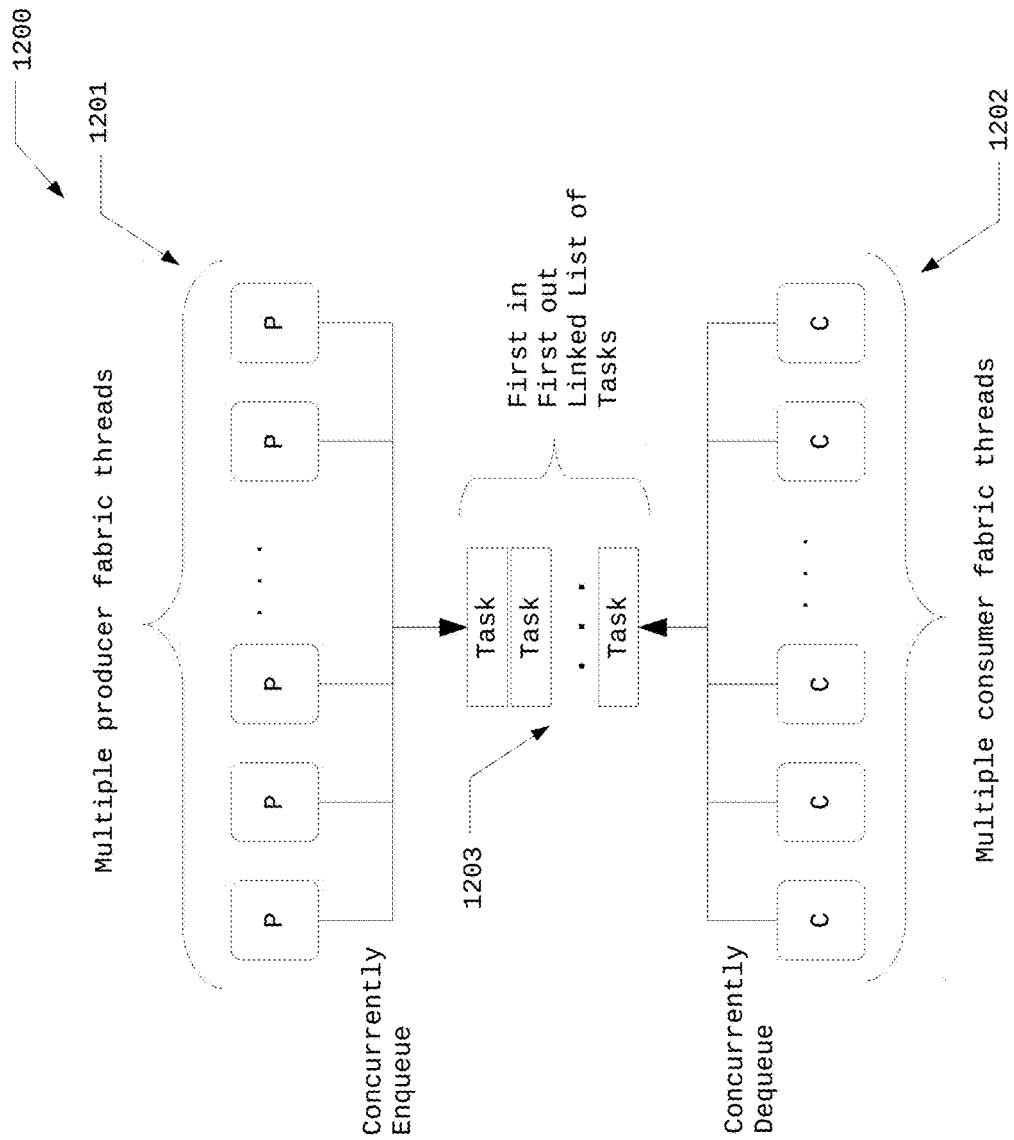
FIG. 12 is a block diagram illustrating an example of a shared multiple producer multiple consumer task queue in accordance with a runtime environment aspect of the claimed subject matter.

FIG. 12 is a block diagram illustrating a shared multiple producer multiple consumer task queue 1200 in accordance with a runtime environment aspect of the claimed subject matter. Shared task queues are multiple producer multiple consumer task queues for concurrently enqueuing tasks from multiple producer threads 1201, and concurrently dequeuing them from multiple consumer threads 1202. Shared task queues provide load balancing to the threads of a fabric. Producer fabric threads address a particular fabric when they enqueue their tasks into a shared task queue; they cannot address a particular fabric thread. Concurrently enqueued tasks are stored in a linked list data structure 1203 in first in first out manner that is shared among the threads of a fabric. The consumer threads of a fabric concurrently dequeue one task at a time from the shared task queue for execution.

Task Clock Assignment

Task priority value is used in defining the order (i.e. prioritization) of task execution in execution fabric. Execution fabric comprises a clock to prioritize user tasks. The clock holds an integer value internally. Each time the clock is increased its output is guaranteed to be monotonically increased per execution fabric, and strictly increased per execution fabric thread. Each execution fabric thread increases the clock value and assigns its current value to a user task as a priority value as soon as the user task is dequeued from the private task queue, only if the user task hasn't been assigned a priority value before.

Atomic Clock

In one embodiment, the execution fabric of the runtime environment maintains an atomic integer value to strictly increase the clock value. Atomic integer internally uses fetch-and-add or compare and swap (CAS) CPU instructions to safely perform the clock updates in parallel on multiple threads.

Cooperative Clock Assignment

LOCK CPU instruction prefix used in atomic operations may cause CPU contention if they are used frequently. In one embodiment of the execution fabric of the runtime environment each execution fabric thread maintains an individual integer value that is strictly increased by 1 for each dequeued user task, and uses the sum of the individual integers of all execution fabric threads as the current clock value for assigning it as a priority value to user tasks.

Tasks are subject to travel among fabrics. Traveling tasks must continue their execution with the original priority value as long as no reprioritization is necessary; if no reprioritization occurs, then tasks keep their priority value during their travel between fabric threads in order to provide the correct ordering of the task execution in the fabric threads where the prioritization matters.

Task Stream

Figure 13:
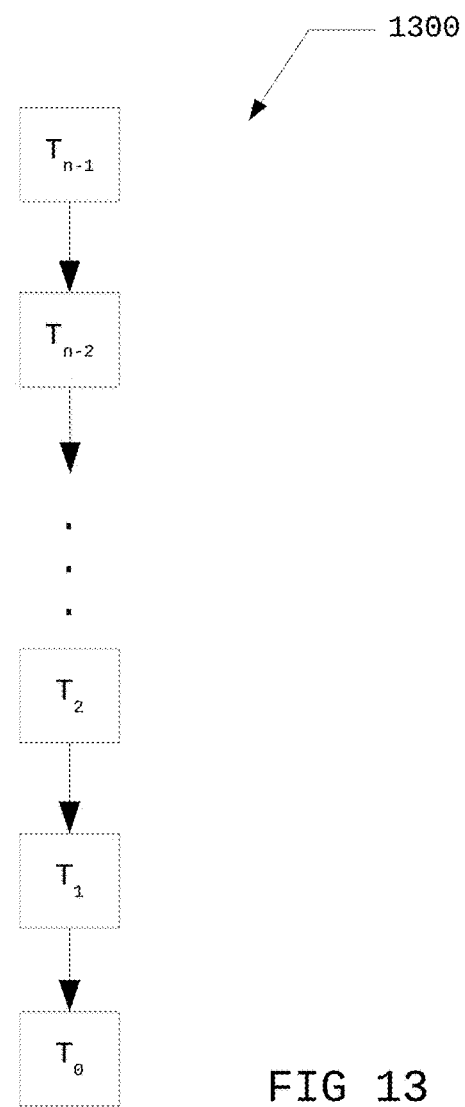
FIG. 13 is an example of a linked list of a task stream in accordance with a runtime environment aspect of the claimed subject matter.

Tasks, dequeued from high performance tasks queues, are organized into task streams at each fabric thread. Task streams are First In First Out (FIFO) queues (i.e. linked list data structures) of memory bound task objects as depicted in FIG. 13.

Task stream has the following properties:
i) S is the size of a task stream (S=n for the task stream shown in FIG. 13).
ii) $T_i$ is the $i^{th}$ task in a task stream; i is the distance of the task from the head of a task stream.
iii) $T_0$ is the task at the head of a task stream.
iv) When $T_0$ is dequeued, $T_i$ becomes $T_{i-1}$ where $1 \leq i < S$.
v) $K_i$ is the key value of $T_i$ where $0 \leq i < S$.
vi) $P_i$ is the priority value of T where $0 \leq i < S$.
vii) P is the priority value of a task stream which is equal to the priority value of $T_0$.
  (a) $P = P_0$ User tasks are queued in user task streams and system tasks are queued in system task streams.

User task stream has the following properties:
i) Every user task in a user task stream has the same key value.
  (a) $K_i = K_{i+1}$ where $0 \leq i < S-1$
  (b) K is the key value of a user task stream which is equal to the key value of its tasks.
  (c) $K = K_i$ where $0 \leq i < S$
ii) $P_{UB}$ is the user level base priority value which is less than or equal to the priority value of the user task at the head of a user task stream
  (a) $P_{UB} \leq P_0$ where $0 \leq i < S$
iii) User tasks are queued in strictly increasing priority order in a user task stream; no priority collision exists as long as no reprioritization takes place.
  (a) $P_i < P_{i+1}$ where $0 \leq i < S-1$; with no reprioritization
iv) Reprioritization might cause priority collision in user task streams.
  (a) $P_i \leq P_{i+1}$ where $0 \leq i < S-1$; with reprioritization
v) P is the priority value of a user task stream which is equal to $P_0$.
  (a) $P = P_0$ System task stream has the following properties:
i) Every system task in a system task stream has the same priority value
  (a) $P_i = P_{i+i}$ where $0 \leq i < S-1$
ii) P is the priority value of the system task stream which is equal to the priority value of its tasks.
  (a) $P = P_i$ where $0 \leq i < S$
iii) $P_{UB}$ is the user level base priority value which is greater than the priority value of system task streams.
  (a) $P < P_{UB}$ where $0 \leq i < S$ Prioritization Task scheduling is a method of enqueuing a task into a private or shared task queue of a fabric. Tasks scheduled in fabric threads are executed in priority order. When both a private task queue and a shared task queue are present in a thread, the priority of the execution of tasks from the private task queue takes precedence over the priority of the execution of tasks from the shared task queue.

Priority order of the tasks dequeued from the private task queue is their dequeue order only if the fabric thread configurations does not include the priority queue. Fabric threads with private task queue but without priority queue could be used in some IO fabric or other fabric configurations.

Priority Queue

In execution fabric thread and in fabric threads where there exists both private task queue and priority queue, the prioritization of the tasks dequeued from the private task queue is accomplished with the utilization of a priority queue; the fabric thread dequeues all of the existing tasks from its private task queue one by one, and assigns each dequeued task a priority value using its clock if the dequeued task hasn't been previously assigned a priority value, and enqueues each dequeued task into its priority queue before it dequeues the highest priority task from the priority queue for execution.

Figure 14:
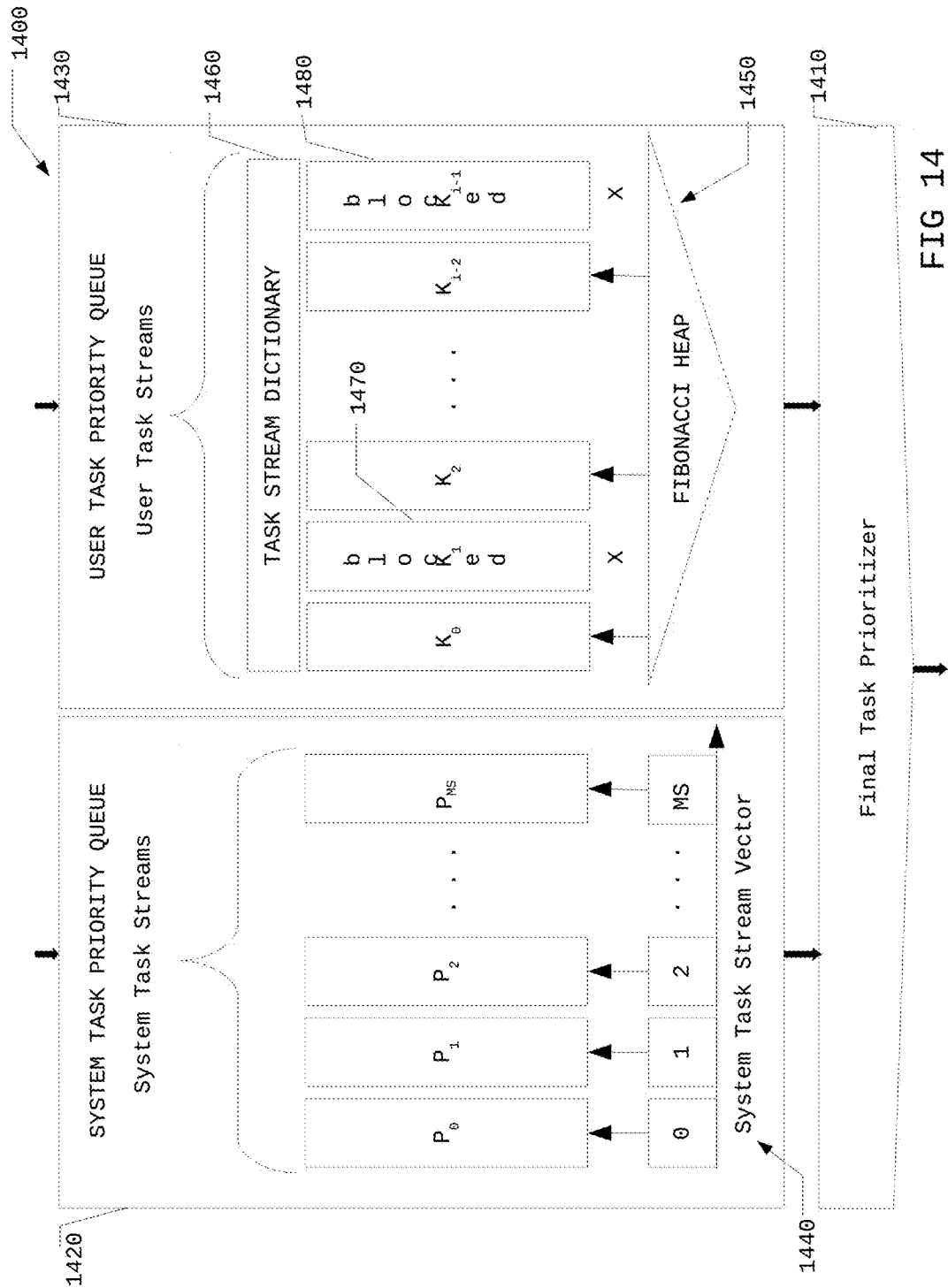
FIG. 14 is a block diagram of an example of a fabric thread priority queue in accordance with a runtime environment aspect of the claimed subject matter.

FIG. 14 is a block diagram of a fabric thread priority queue in accordance with a runtime environment aspect of the claimed subject matter. The priority queue comprises a system task priority queue 1420, a user task priority queue 1430, and a final task prioritizer 1410. In an embodiment of a priority queue as depicted in FIG. 14, system tasks are prioritized in a system task priority queue 1420, and user tasks are prioritized in a user task priority queue 1430. Task streams rather than individual tasks are used in prioritization. The priority value of a task stream is the priority value of the head task of the stream.

Vector of system task streams 1440 is utilized in prioritization of system tasks in preferred embodiment of system task priority queue 1420. The size of the vector is equal to the number of system level priorities. Each system task dequeued from the private task queue is enqueued into the system task stream that is located at the index of the system task stream vector 1440 which is equal to the priority value of the system task. System task priority queue 1420 is empty only if all system task streams of its system task stream vector 1440 is empty.

Fibonacci heap 1450 is utilized in prioritization of user task streams in an embodiment of user task priority queue 1430, nonetheless, using binary heap, or binomial heap or another data structure that achieves prioritization does not change the outcome. Fibonacci heap 1450 stores the task streams. Fibonacci heap 1450 is assisted with a task stream dictionary 1460 in the user task priority queue 1420. In an embodiment as shown in FIG. 14 red-black tree data structure may be used for implementing the task stream dictionary, however, using hash table or another data structure that achieves dictionary functionality does not change the outcome. Task stream dictionary 1460 stores pointers to task streams and provides a fast access to a task stream for a given task key. Each user task that is dequeued from the private task queue is enqueued into the user task streams that matches its key value. Task stream dictionary 1460 is utilized to find the matching user task stream that matches the key value of the dequeued user task.

In an embodiment, the fabric thread utilizes final task prioritizer 1410 to dequeue the highest priority task from the priority queues. Final task prioritizer gives precedence to system task priority queue 1420 over the user task priority queue 1430 in prioritization process. If the system task priority queue is not empty, then the highest priority system task (i.e. the system task with lowest priority value) is dequeued from the system task priority queue; final task prioritizer 1410 linearly searches the system task stream vector 1440 from the beginning to the end to find the first task stream that is not empty, and dequeues a system task from that system task stream. If the system task priority queue is empty, then the highest priority user task (i.e. the user task with the lowest priority value) is dequeued from the user task priority queue; final task prioritizer utilizes fibonacci heap or the like to find the task stream with the highest priority and dequeues a user task from that task stream. Each time a user task is dequeued from a user task stream, the priority of that user task stream changes as the head of the user task stream changes. Fibonacci heap 1440 is asked to reprioritize the task streams to compensate this change in that task stream.

User task streams are blocked and unblocked for concurrency control and other task orchestration purposes. Blocking a task stream is accomplished by marking it as blocked. Example blocked task streams $K_1$ 1470 and $K_{i+1}$ 1480 are shown in FIG. 14. No task is dequeued from a blocked task stream until the task stream is unblocked (i.e. marked as unblocked). The user task priority queue is empty, only if all existing user task streams of the user task priority queue are blocked. The priority queue is empty, only if both system task priority queue and user task priority queue are empty. In other words, blocked task streams are removed from task prioritization process and no task is executed from blocked task stream until the blocked task stream is unblocked.

If there is no private task queue is present, or private task queue is present but empty, or both the private task queue and the priority queue of the fabric are empty, then the fabric thread dequeues a task from the shared task queue for execution. The priority order of the tasks dequeued from the shared task queue are their dequeue order.

Task Executor

Every execution fabric comprises a task executor and a program interpreter (e.g. LLVM engine or ECMAScript engine) for executing tasks. Task executor executes both native and managed behaviors. The task executor utilizes a program interpreter for execution of managed behaviors. The task executor executes the interpreted programs in an isolated interpreted program execution context. The task executor also handles transitions from interpreted program (i.e. managed) execution context to native execution context and vice versa with interfaces and callback mechanisms provided by the program interpreters.

Task Parallelization

Implicit parallelization of behavior executions of different program unit instances is accomplished by the parallelization of task executions. Parallelization of individual task executions is accomplished by scheduling the simultaneous executions of tasks with different key values on separate fabric threads that run in parallel (i.e. assigned to run on separate processing cores). Nonetheless, an execution of a program unit instance behavior may further be parallelized by scheduling new tasks for its IO operations and sub-behavior executions on fabric threads that run in parallel.

Coroutine

The runtime environment divides the execution context of an execution fabric thread into multiple execution contexts for high performance cooperative multitasking of the interpreted programs executed by user tasks within the same execution fabric thread. The division of the execution context of an execution fabric thread into multiple execution contexts is accomplished by executing each user task in a coroutine execution context (also referred to herein as coroutine). Execution of user tasks in coroutine enables user tasks to yield execution to the main subroutine of the execution fabric thread, so that the main subroutine of the execution fabric thread may continue executing other tasks in priority order. For instance, when an execution of a program unit instance behavior written in direct style programming paradigm and executed by a user task in a coroutine cannot proceed its execution further and must wait for the result of a previously scheduled IO operation, it yields its execution to the main subroutine of the execution fabric thread, so that other tasks may be executed in priority order. The restoration of a previously yielded user task is achieved by an execution of a system task at the fabric thread where the user task was yielded; the system task instructs the execution fabric thread to restore the coroutine of the previously yielded task at its execution and may provide the result of the IO operation as well. The coroutine of the yielded task may be cached in the user task, and the corresponding system task may cache the user task.

Continuation

The runtime environment executes the operations on program unit instances defined in interpreted languages in continuation passing style (CPS) through executions of continuation interpreted programs. Every program unit behavior execution is started as an execution of a continuation interpreted program (also referred to herein as continuation) regardless if they schedule other continuations or not. Each continuation execution may schedule zero, one or more continuation executions forming a tree of continuation executions as defined in the interpreted program written in CPS. Each continuation of a tree of continuation is executed by a user task in a coroutine on the same fabric thread. The user task executes the root level continuation a first time it is executed on the execution fabric thread. A system task is scheduled for each continuation passing style function call made in a continuation interpreted program executed by the user task in order to schedule the executions of the descendant continuations by the user task. System tasks used for scheduling the executions of the descendant continuations by the user tasks are referred to herein as continuation system tasks. Continuation system tasks carry a reference to the user task and other state necessary to carry out the continuation. Continuation system tasks may be scheduled to execute on series of threads prior to their final execution. The final execution of the continuation system tasks are always done on the execution fabric thread where the original user task which schedules the continuation system tasks is being executed. Consequently, after the final execution of the continuation system task, the execution fabric thread executes the user task for the execution of the scheduled descendant continuation. Continuation system tasks are completed at the completion of their final executions. For instance, to accomplish an execution of a continuation with an IO result, a continuation system task may be scheduled to be executed on an IO fabric thread for an asynchronous execution of an IO operation. When the execution of the IO operation is done, the continuation system task may travel back to the execution fabric thread for the final execution. The user task then executes the continuation at the execution fabric thread with the IO result. Each continuation may be yielded and restored during their execution.

Each user task maintains a continuation reference count to count the number of outstanding scheduled continuations; the continuation reference count is initialized to zero at the creation of each user task. The continuation reference count of a user task is incremented for each scheduled continuation, and decremented at the completion of the execution of each scheduled continuation including the root level continuation executed by the user task. The execution of a user task is considered to be completed only if the continuation reference count is decremented to 0 after the completion of an execution of a continuation.

Implicit Concurrency Control

Concurrency control interval covers the execution of an operation on a program unit instance from the beginning of the execution of the first continuation to the end of the execution of the last continuation which is tracked by the continuation reference count of the user task.

The runtime environment provides implicit concurrency controls to executions of operations on program unit instances via user tasks in two steps.

At the first step, the runtime environment ensures that the user tasks with the same key value are always executed in the same execution fabric thread. In other words, it ensures no overlapped execution of operations regarding the same program unit instance exists across multiple fabric threads. User tasks with the same key value can be routed to the same thread for execution by the utilization of a hash function. For instance, each user task key value may be hashed using a hash function to generate a 64-bit resultant integer and the remainder after the division of the resultant integer by the current size of the fabric (i.e. number of fabric threads) may generate the index of the target fabric thread. When the index is known, the private task queue of the target fabric thread can be obtained from the execution fabric to enqueue the user task into the private task queue of the target fabric thread for execution.

At the second step, the user tasks that have the same task key value are enqueued into the same user task stream of the execution fabric thread when they are dequeued from the private task queue and enqueued into the priority queue. The user task stream that matches the key value of the user task is obtained from the task stream dictionary of the execution fabric thread by using the key value of the user task. If no user task stream exists that has the same task key value with the user task, then the execution fabric thread creates a new user task stream with the user task in it, inserts it into the fibonacci heap, prioritizes the fibonacci heap, and inserts its pointer into the task stream dictionary. In order to prevent an overlapped execution of another user task from the user task stream that has the same key value with the user task being executed, the user task stream is blocked right before the execution of the first continuation of the user task starts, and unblocked after the execution of the last continuation of the user task is completed. Blocking a user task stream prevents the execution of another user task from the same user task stream if the user task being executed yields its execution or it is executed through multiple continuations until the user task stream is unblocked.

Concurrency Control Mechanisms

The concurrency control type and the concurrency control settings of program units are specified by the programmers as a part of the program unit configuration definition. The concurrency control types provided by the runtime environment comprises mutually exclusive concurrency control, semaphore concurrency control, and readers-writers concurrency control.

The runtime environment provides implicit mutually exclusive concurrency control by keeping the user task stream of each user task blocked during execution.

The runtime environment provides implicit semaphore concurrency control by the utilization of a concurrency control count integer that is initialized to the given initial semaphore count for a user task stream that requires semaphore concurrency control. The concurrency control count of the user task stream is decremented each time before the execution of a user task from that user task stream starts and is incremented each time the execution of a user task from that user task stream completes. The user task stream is blocked only if the concurrency control count goes down to 0 and is kept unblocked as long as the concurrency control count is greater than zero.

The runtime environment provides implicit readers-writers concurrency control by the utilization of a concurrency control count integer that is initialized to 0 for a user task stream that requires readers-writers control.

The following algorithm can be utilized for each dequeued user task before they are executed in an embodiment of the runtime environment providing an implicit readers-writers concurrency control:

```
i) If the user task is about to execute a read operation
    (a) Increment the concurrency control count
    (b) Start executing the user task
ii) End If
iii) If the user task is about to execute a write operation
    (a) Block the user task stream
    (b) If the concurrency control count is zero
        1. Start executing the user task
    (c) Else
        1. Do not execute the user task keep it at the head of
        2. its task stream
    (d) End If
iv) End If
```

The following algorithm can be utilized for each completed user task in an embodiment of the runtime environment providing an implicit readers-writers concurrency control:

```
i) If the user task completed an execution of a write operation
    (a) Unblock the user task stream
ii) End If
iii) If the user task completed execution of a read operation
    (a) Decrement the concurrency control count
    (b) If the concurrency control count is 0
        1. If the user task stream is blocked
            i. Unblock the user task stream
        2. End If
    (c) End If
iv) End If
```

Concurrently executed user tasks of the same task stream are cached in system tasks.

Direct Style with Futures

The runtime environment allows mixing continuation passing style and direct style programming in interpreted programs. The runtime environment utilizes implicit future variables and implicit promise functions in order to provide implicit concurrency to each execution of interpreted programs written in direct-style with implicit concurrency control.

In interpreted programs written in direct style a call made to an implicit promise function to execute a concurrent IO operation or a behavior schedules a system task to concurrently execute the implicit promise function on a fabric thread and returns an associated implicit future variable (also referred to herein as future, or implicit future) to the caller. The system task scheduled to execute the promise functions is also referred to herein as promise system task. Promise system tasks may be scheduled to execute on a series of threads prior to their final execution. Final execution of the promise system tasks is always done on the execution fabric thread, where the original user task which schedules the promise system tasks is being executed. The value of the implicit future is resolved further in execution time by the scheduled promise system task in the execution fabric thread at its final execution where the interpreted program is being executed on via a user task. Promise system tasks carry a reference to the user task and the other state necessary to accomplish the execution of the promise.

Scheduling a promise system task via an asynchronous IO operation or a behavior execution call does not cause the execution of a continuation to yield the execution; thus, the execution of a continuation and execution of multiple promises may run concurrently. When an execution of a continuation interpreted program accesses the value of an unresolved future, the coroutine executing the continuation yields execution to the execution fabric thread subroutine. If there exist outstanding scheduled continuations, their executions are deferred until the execution of the yielded continuation is restored and completed. When the asynchronous IO operations or concurrent behavior executions scheduled with the promise system tasks are completed, the promise system tasks are updated with the IO or execution results and scheduled to execute on the execution fabric thread that executes the user task. The corresponding execution fabric thread subroutine then dequeues and executes the promise system tasks. Execution of a promise system task in the execution fabric thread resolves the value of the associated future and restores the coroutine executing the continuation yielded due to accessing to the value of the unresolved future. When a yielded continuation is restored, it continues its execution from the instruction it was yielded from.

Implicit Concurrency Control for Continuation Passing Style

Figure 15:
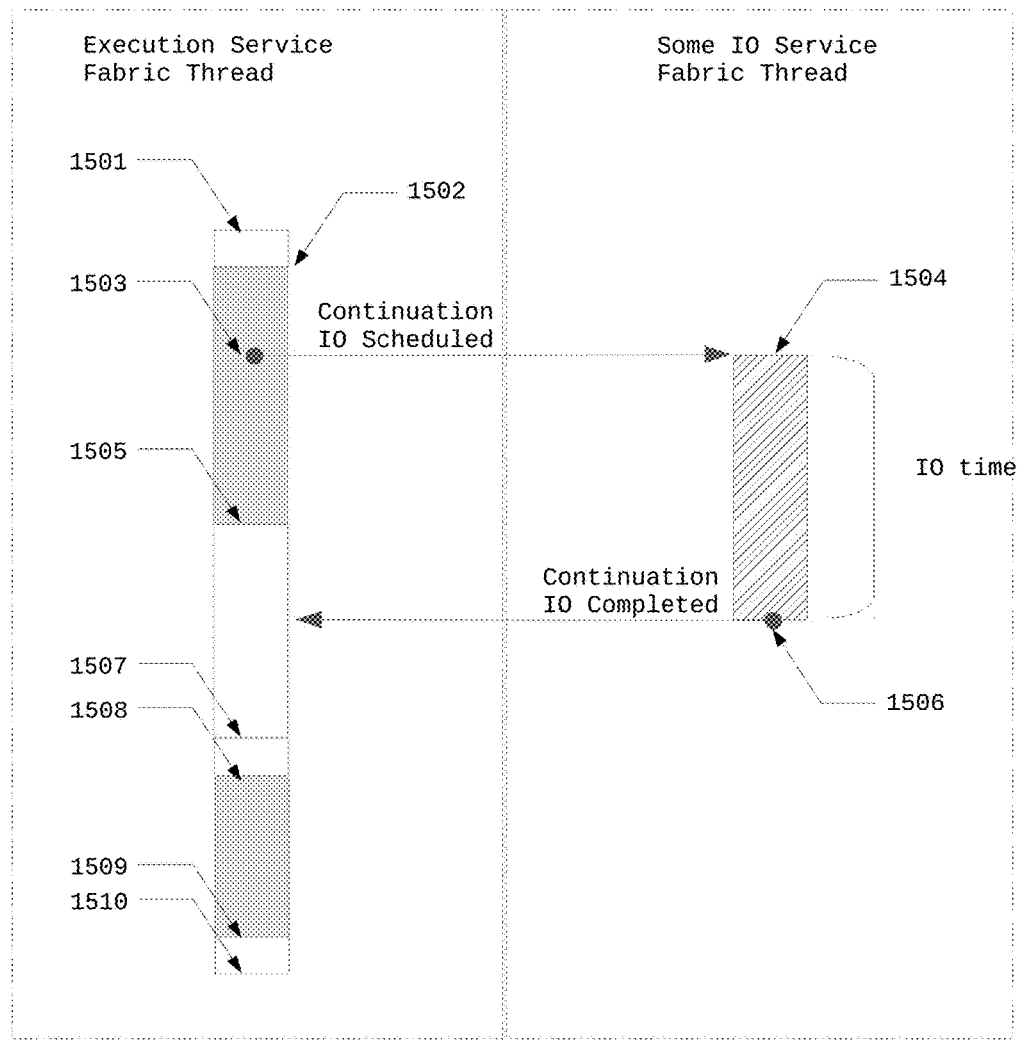
FIG. 15 is an exemplary control flow diagram of implicit concurrency control for continuation passing style programming paradigm in accordance with a runtime environment aspect of the claimed subject matter.

Implicit concurrency control for the following sample ECMAScript code written in continuation passing style (CPS) is depicted in FIG. 15 in accordance with the runtime environment aspect of the subject matter.

```
//
// Continuation Function
//
    function someContinuation(
    a) someIOResult) {
    //
    // some code
    //
    }
//
// Main Behavior Continuation
//
    (function( ) {
    a) var someParameter = someFunctionCall( );
    b) someIOCallWithContinuation(
        i) someParameter,
        ii) someContinuation);
    c) someOtherFunctionCall( );
    });
```

Execution fabric thread dequeues the user task and executes it at reference numeral 1501. The execution of the user task starts with setting the continuation reference count of the user task to 0. The continuation reference count is incremented for each continuation scheduled, therefore it is incremented to 1 at the execution of the user task to cover the scheduled execution of the root level continuation by the user task. Then the user task stream is blocked to prevent another user task to be executed from the user task stream that has the same key value with the user task being executed. In order to execute the continuation interpreted program, the user task acquires a coroutine and yields the execution to the acquired coroutine.

At reference numeral 1502, the execution of the continuation interpreted program is started in an isolated interpreted program execution context.

At reference numeral 1503, "someIOCallWithContinuation" function is called with "someParameter" value and "someContinuation" continuation function, and consequently a new continuation system task that carries a reference to the user task and the value of "someParameter" is scheduled on some IO fabric thread to execute some IO operation. Then the continuation reference count is incremented to 2.

At reference numeral 1504, the execution of the IO operation starts; at this point the execution of the root level continuation interpreted program and the execution of the scheduled IO operation are overlapped.

At numeral 1505, the root level continuation interpreted program exits, the execution yields to the execution fabric thread executing the user task. The user task decrements the continuation reference count to 1. Consequently, the execution of the user task returns to the main subroutine of the execution service fabric. Execution service fabric thread executes other tasks from unblocked task streams in priority order. Meanwhile the IO operation continues its execution concurrently.

At reference numeral 1506, the scheduled IO operation is completed and the continuation system task is updated with the IO result, then the continuation system task is scheduled to execute on the execution fabric thread. The execution fabric thread continues executing other tasks until it dequeues the continuation system task that carries the value of "someIOResult" from its priority queue. The dequeued continuation system task is executed at reference numeral 1507.

At reference numeral 1508, "someContinuation" function is executed in an isolated interpreted program execution context with the value of the IO result passed as "someIOResult" argument to the execution of "someContinuation" function.

At reference numeral 1509, "someContinuation" exits. The execution yields to the execution fabric thread executing the user task. The user task decrements the continuation reference count to 0. The user task releases the coroutine and user task stream that has the same key value with the user task is unblocked to allow other task that share the same key value to be executed.

Implicit Concurrency Control for Direct-Style

Figure 16:
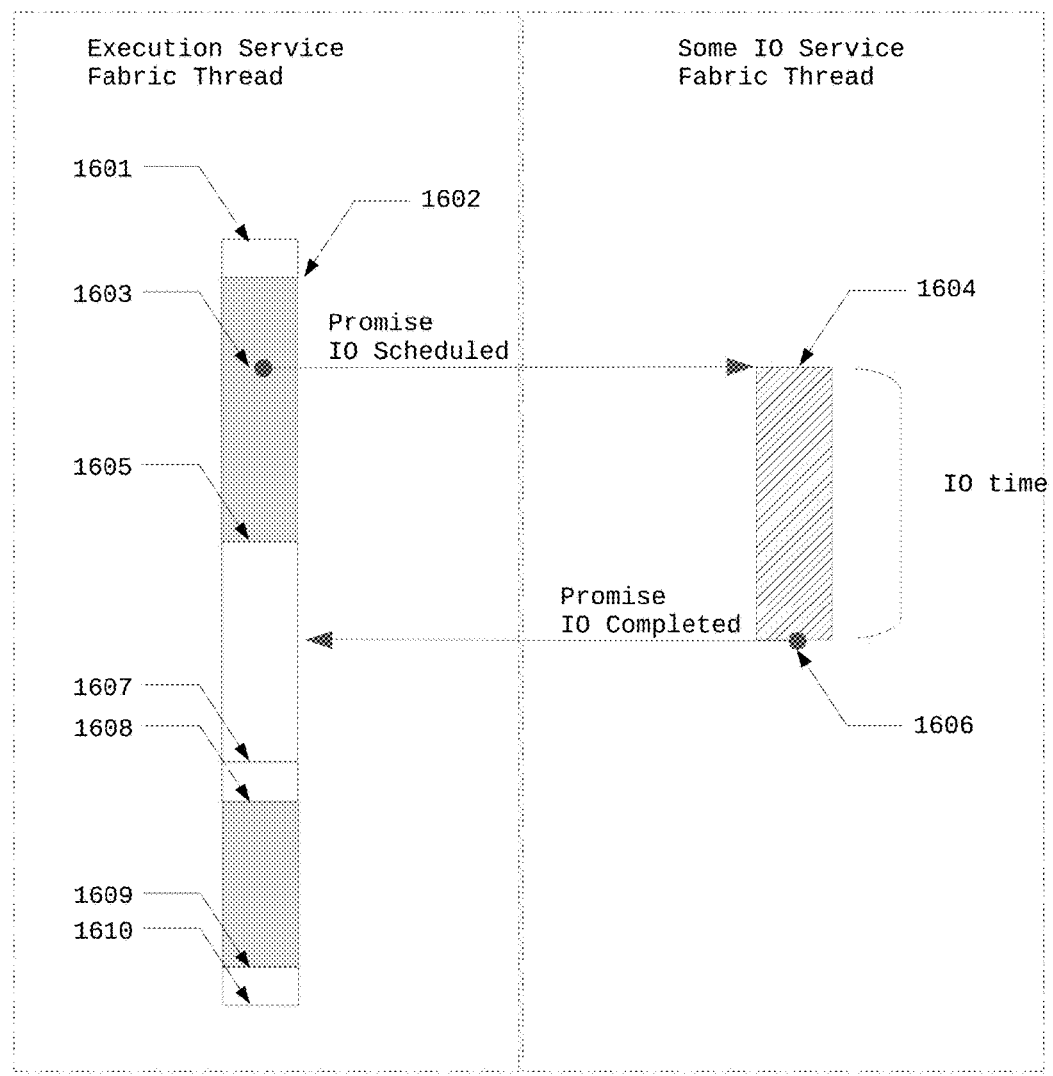
FIG. 16 is an exemplary control flow diagram of implicit concurrency control for direct style programming paradigm in accordance with a runtime environment aspect of the claimed subject matter.

Implicit concurrency control for the following sample ECMAScript code written in direct style (DS) is depicted in FIG. 16 in accordance with the runtime environment aspect of the subject matter.

```
//
// Main Behavior Continuation
//
(function( ) {
a) var someParameter = someFunctionCall( );
b) var future = someImplicitIOPromise(someParameter);
c) // Do some work here ...
d) future.valueOf( );
e) // Do some work here ...
});
```

Execution fabric thread dequeues the user task and executes it at reference numeral 1601. The execution of the user task starts with setting the continuation reference count of the user task to 0. The continuation reference count is incremented for each continuation scheduled, therefore it is incremented to 1 at the execution of the user task to cover the scheduled execution of the root level continuation by the user task. Then the user task stream is blocked to prevent another user task to be executed from the user task stream that has the same key value with the user task being executed. In order to execute the continuation interpreted program, the user task acquires a coroutine and yields the execution to the acquired coroutine.

At reference numeral 1602, the execution of the continuation interpreted program is started in an isolated interpreted program execution context.

At reference numeral 1603, "someImplicitIOPromise" function is called with "someParameter" value, and consequently a new promise system task that carries a reference to the user task and the value of "someParameter" is scheduled on some IO fabric thread to execute some IO operation.

At reference numeral 1604, the execution of the IO operation starts; at this point the execution of the root level continuation interpreted program and the execution of the scheduled IO promise are overlapped.

At reference numeral 1605, the main behavior continuation execution accesses the value of unresolved "future" variable. Since the value of "future" variable is not resolved yet, the continuation running in the coroutine yields execution to the execution fabric thread subroutine. Execution service fabric thread executes other tasks from unblocked task streams in priority order. Meanwhile the IO operation continues its execution concurrently.

At reference numeral 1606, the scheduled IO operation is completed and the promise system task is updated with the IO result, then the promise system task is scheduled to execute on the execution fabric thread. The execution fabric thread continues executing other tasks until it dequeues the promise system task that carries the value of "someIOResult" from its priority queue.

The dequeued continuation system task is executed at reference numeral 1607, which consequently resolves the value of the future variable and restores the coroutine executing the yielded continuation interpreted program.

After as the coroutine is restored, at 1608 the yielded interpreted program continues its execution from the instruction it was yielded from.

At reference numeral 1609, the restored continuation exits. The execution yields to the execution fabric thread executing the user task. The user task decrements the continuation reference count to 0. The user task releases the coroutine and the user task stream that has the same key value with the user task is unblocked to allow other tasks that share the same key value to be executed.

Overall Data Flow Example

Figure 17:
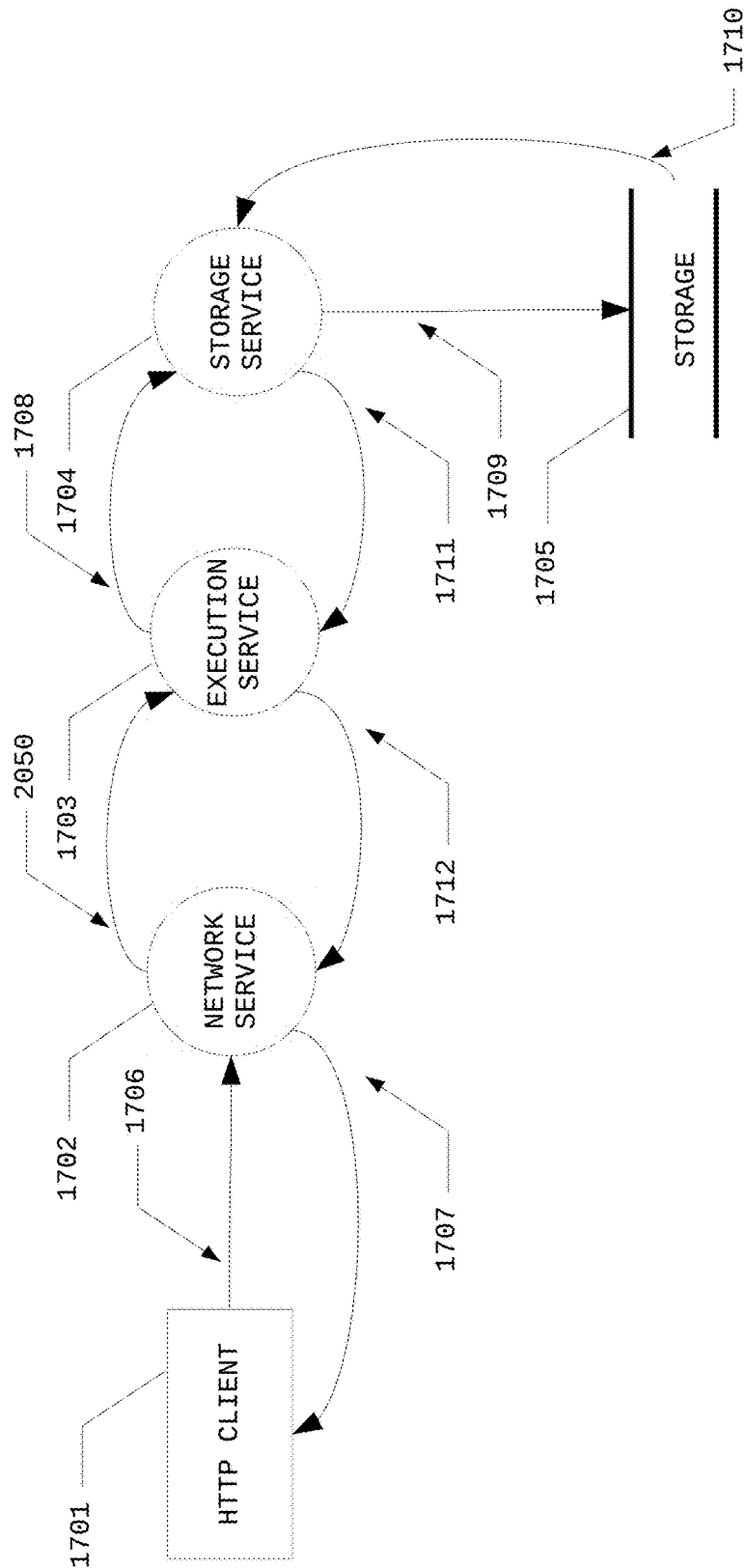
FIG. 17 is an exemplary data flow diagram of a web request in accordance with a runtime environment aspect of the claimed subject matter.

FIG. 17 is an exemplary data flow diagram of a web request in accordance with a runtime environment aspect of the claimed subject matter. In this example, an HTTP client 1701 makes a request to a runtime environment comprising a network fabric 1702, an execution fabric 1703, and a storage fabric 1704 with a local storage 1705. Other embodiments of the runtime environment do not change the main principles outlined in this example.

In this example, the runtime environment hosts a service comprising program units. The HTTP client 1701 makes a connection request and sends network packages 1706 regarding its HTTP request to the network fabric 1702. The runtime environment uses the network fabric 1702 to communicate back 1707 with the HTTP client 1701. If the connection is a secure connection (e.g. TLSv1.2), then the HTTP client 1701 and the network fabric 1702 communicate back and forth to establish a secure connection. After the connection is established, the HTTP client 1701 and the network fabric 1702 communicate back and forth for the runtime environment to receive all the bits of the HTTP request. If the HTTP request cannot be created due to a client error, corrupted request, or internal error occurring in the runtime environment, then the error response is sent back to the HTTP client 1701.

In this example, a task that represents the http request is created and scheduled to be executed on the execution service 1703. In this example the HTTP request is about executing a mutually exclusive behavior of a program unit instance, therefore the task continues 1708 from execution fabric 1703 to the storage fabric 1704 to read the behavior from the storage 1705. The storage fabric 1704 schedules an IO operation 1709 to read the behavior, which may be already compiled, from the storage 1705.

When reading the behavior is completed 1710, a user task is scheduled 1711 (i.e. enqueued into) to execute on a particular execution fabric 1703 thread identified by the utilization of a hash function and the task key (i.e. program unit instance key) value which is obtained from the HTTP request. The program unit behavior, which is an interpreted program, is executed on the execution fabric 1703 thread via the user task.

During the task execution, continuation or promise system tasks may be scheduled to execute 1708 on the storage fabric 1704 for storage operations or scheduled to execute 1712 on the network fabric 1702 for making outgoing network calls (e.g. HTTP requests to other fabrics) and no other execution of any operation on the same program unit instance is allowed. Finally a system task is scheduled to execute 1712 on the network fabric 1702 for network fabric 1702 to respond 1707 the execution response back to the HTTP client 1701.

In view of the exemplary systems described supra, methodologies that may be implemented in accordance with the disclosed subject matter will be better appreciated with reference to flow charts presented in FIGS. 18-23. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 18:
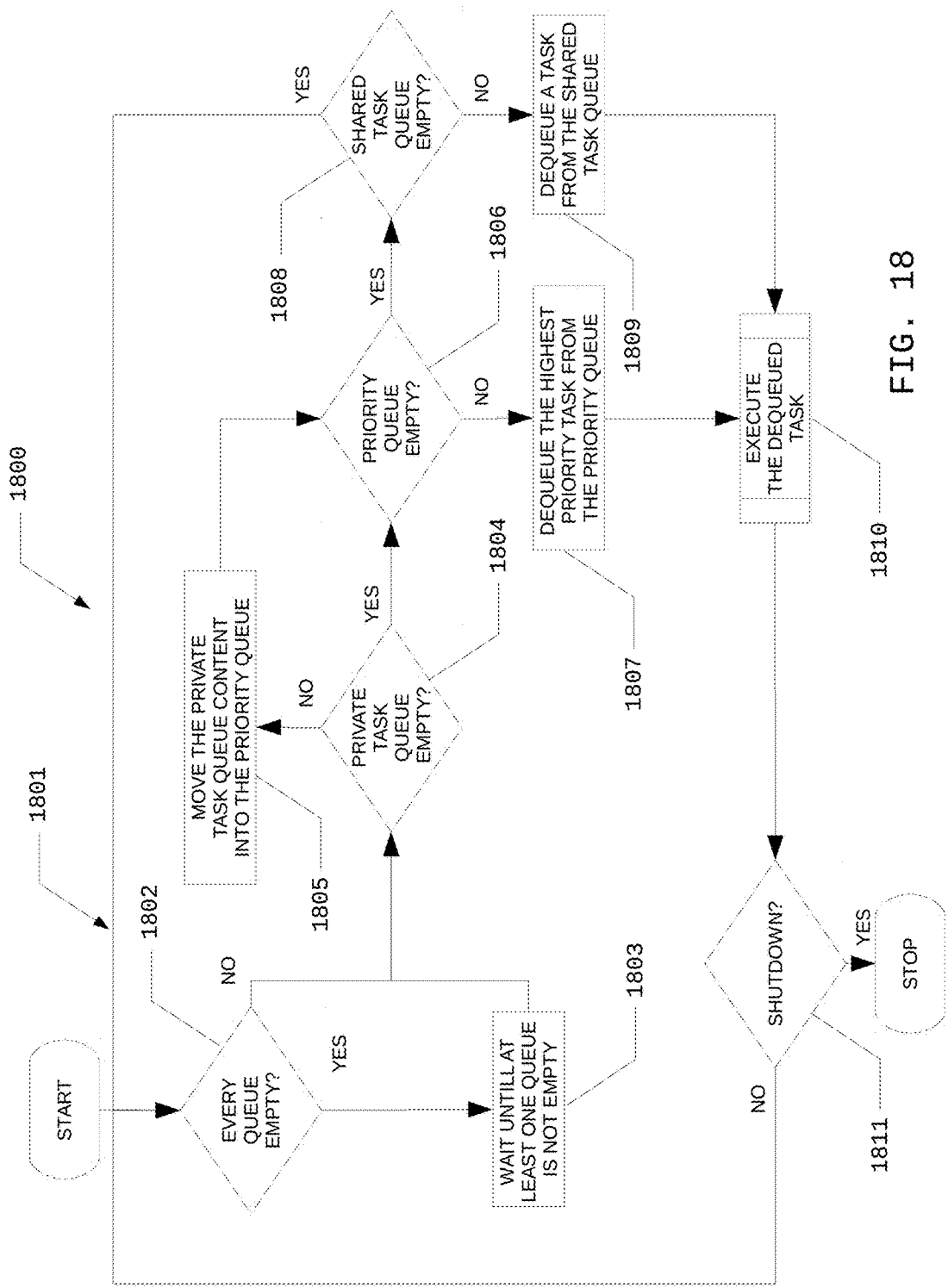
FIG. 18 is a flow chart of an example of a method of an execution fabric thread subroutine in accordance with a runtime environment aspect of the claimed subject matter.

FIG. 18 is a flow chart illustrating an example of a method performed by an execution fabric thread subroutine 1800 in accordance with a runtime environment aspect of the claimed subject matter. In this example, a private task queue, a priority queue, and a shared task queue are present (see, for example, FIG. 10). Execution fabric thread subroutine may comprise a loop 1801 to handle received tasks via task queues.

At decision block 1802, a determination is made as to whether every queue present in the execution fabric thread is empty. If every queue is empty (or equivalent) at decision block 1802, then the method proceeds to block 1803 to wait until a task arrives to any of the queues of the fabric thread.

If at least one task queue is not empty at decision block 1802, then the method dequeues a task in priority order. The method proceeds to decision block 1804 to determine as to whether the private task queue is empty. If at 1804, the private task queue is not empty (or equivalent), then the method proceeds to block 1805 to move the private task queue content into the priority queue.

If the private task queue is empty at decision block 1804, then the method proceeds to decision block 1806 to determine whether the priority queue is empty.

If the priority queue is not empty at decision block 1806, then the method proceeds to block 1807 to dequeue the highest priority task from the priority queue, then proceeds to block 1810 to execute the dequeued task (which may be executed as a subroutine).

If the private task queue is empty at decision block 1804 and the priority queue is empty at decision block 1806, then the method proceeds to decision block 1808 to determine whether the shared task queue is empty.

Figure 20:
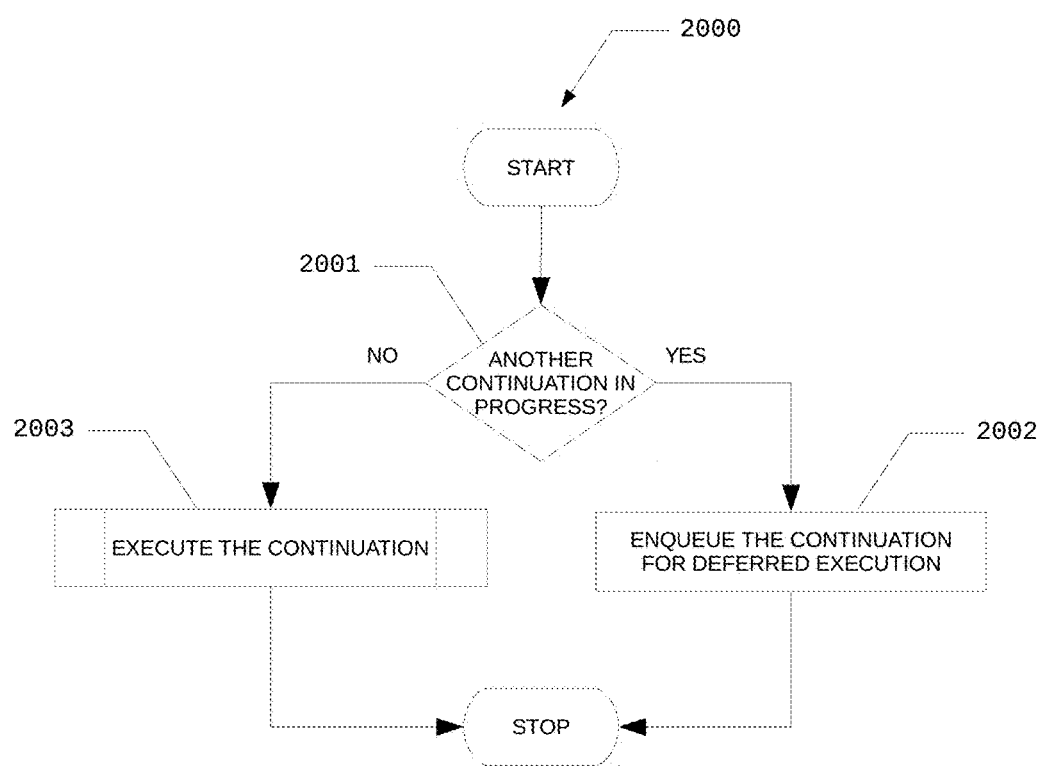
FIG. 20 is a flow chart of an example of a method of executing a continuation system task in an execution fabric thread in accordance with a runtime environment aspect of the claimed subject matter.
Figure 21:
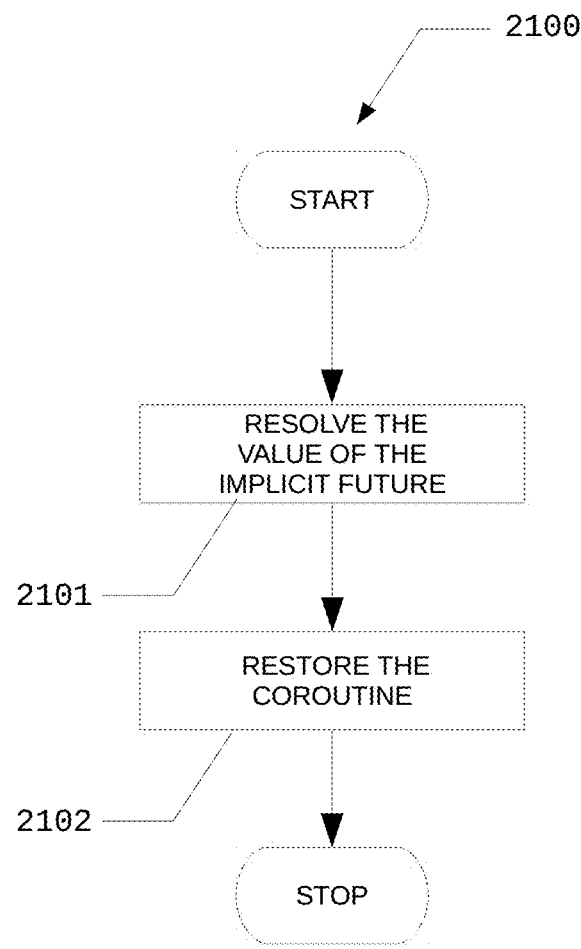
FIG. 21 is a flow chart of an example of a method of executing a promise system task in an execution fabric thread in accordance with a runtime environment aspect of the claimed subject matter.

If the shared task queue is not empty at decision block 1808, then the method proceeds to block 1809 to dequeue a task from the shared task queue and proceeds to block 1810 to execute the dequeued task (which may be executed as a subroutine). For example, aA method of executing a user task 1900 is depicted in FIG. 19, a method of executing a continuation system task 2000 is depicted in FIG. 20, and a method of executing a promise system task 2100 is depicted in FIG. 21.

Each time a dequeued task is executed at block 1810, the method proceeds to decision block 1811 to determine whether shutdown task execution status is returned. If "shutdown" execution status is determined at decision block 1811, then the method terminates the execution fabric subroutine loop.

If the shared task queue is empty at decision block 1808, then the method returns back to decision block 1802 to continue to the execution fabric subroutine loop 1801.

Figure 19:
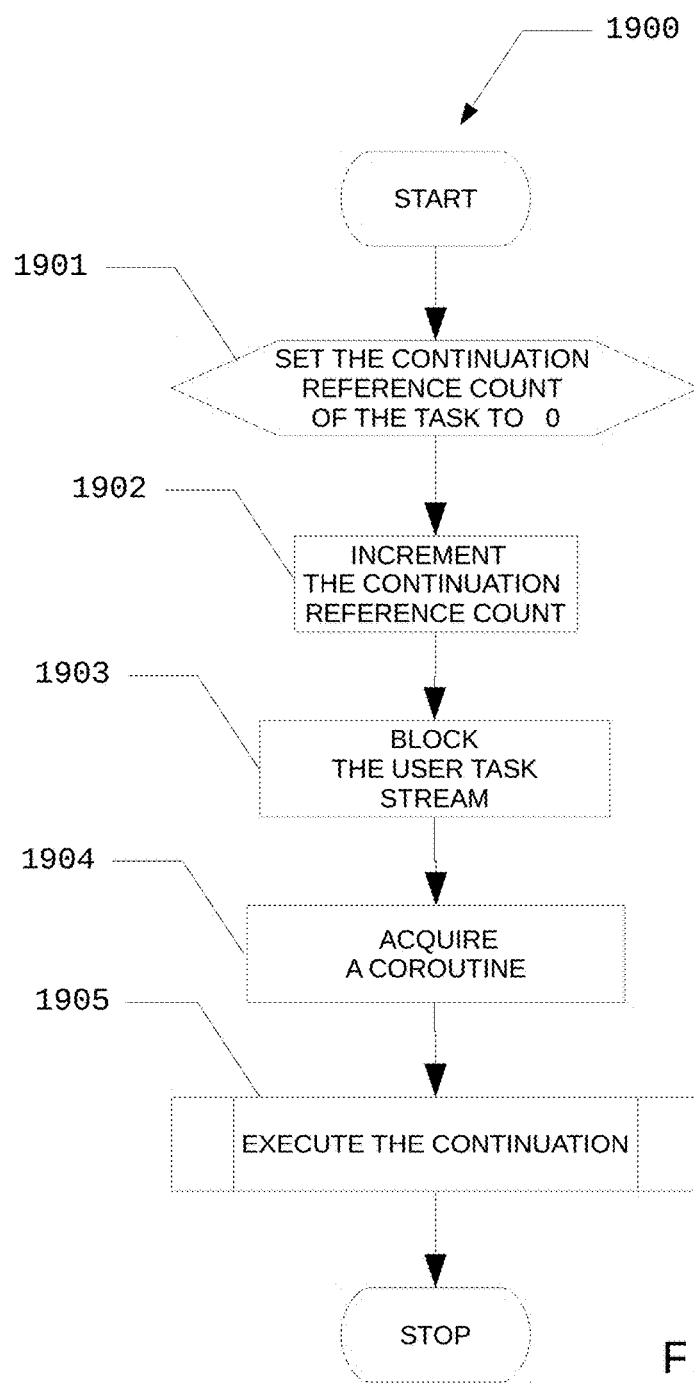
FIG. 19 is a flow chart of an example of a method of executing a user task in an execution fabric thread in accordance with a runtime environment aspect of the claimed subject matter.

FIG. 19 is a flow chart of an example of a method performed by a user task execution module in an execution fabric thread 1900 in accordance with a runtime environment aspect of the claimed subject matter.

At block 1901, user task execution module sets the value of the continuation reference count integer of the task to 0.

At block 1902, user task execution module increments the continuation reference count to cover the scheduled execution of the root level continuation by the user task.

At block 1903, user task execution module blocks the user task stream that has the same key value with the user task being executed to prevent other tasks to be executed from that user task stream.

At block 1904, user task execution module acquires a coroutine in order to execute the continuation interpreted program in a coroutine context for cooperative multitasking within the same execution fabric thread. Acquisition of the coroutine may be accomplished by creating a new user task continuation interpreted program or retrieving a previously created user task continuation interpreted program from a cache.

Figure 22:
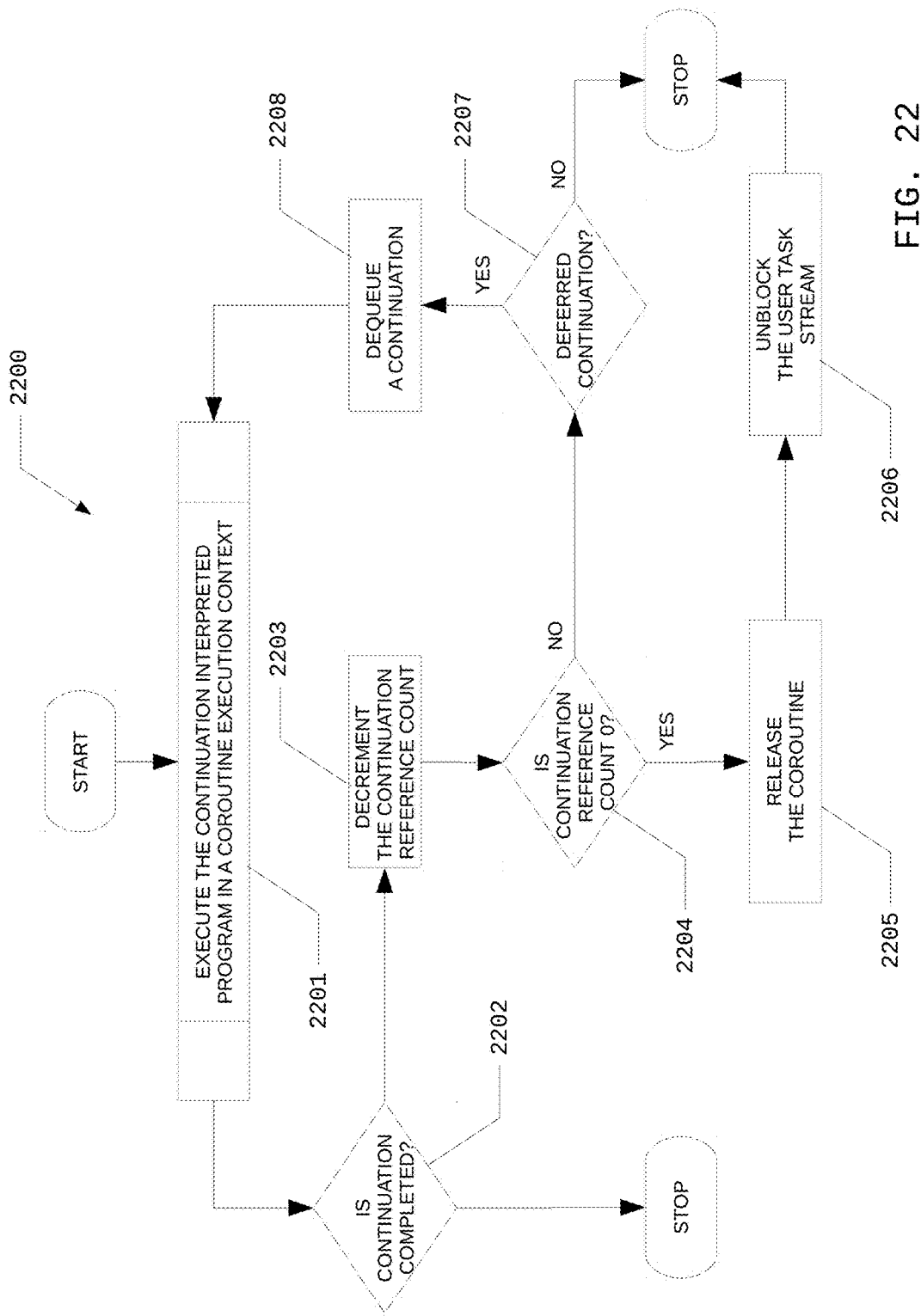
FIG. 22 is a flow chart of an example of a method of the execution of a continuation in accordance with a runtime environment aspect of the claimed subject matter.

At block 1905, which may be performed as a subroutine, user task execution module proceeds with execution of the user task continuation interpreted program. An example of a method of the execution of continuation 2200 is depicted in FIG. 22.

FIG. 20 is a flow chart of an example of a method performed by a continuation system task module in an execution fabric thread 2000 in accordance with a runtime environment aspect of the claimed subject matter.

At decision block 2001, a determination is made as to whether another system task continuation that belongs to the same continuation tree is in progress. An execution of a continuation system task or continuation user task interpreted program that yielded its execution but not restored before the execution of a continuation system task causes a continuation to be left in progress, and the execution of the continuation that is in progress must be completed before other continuations to be executed.

If another continuation that belongs to the same continuation tree is in progress at decision block 2001, then continuation system task module continues at block 2002 to enqueue the continuation for a deferred execution into a first in first out queue maintained in the user task for deferred continuations. If no another continuation that belongs to the same continuation tree in progress decision block 2001, then continuation system task module continues at block 2003 to execute the continuation, which may be performed as a subroutine. An example of a method of execution of continuation 2200 is depicted in FIG. 22.

FIG. 21 is a flow chart illustrating an example of a method performed by a promise system task execution module in an execution fabric thread 2100 in accordance with a runtime environment aspect of the claimed subject matter.

At block 2101, promise system task execution module resolves the value of an implicit future variable.

At block 2102, a coroutine of a yielded task is restored. The coroutine of the yielded task may be cached in a user task, which may be cached in the promise system task. As soon as the coroutine is restored, the previously yielded continuation interpreted program continues its execution from the instruction it was yielded from.

FIG. 22 is a flow chart illustrating an example of a method performed by a continuation execution module 2200 in accordance with a runtime environment aspect of the claimed subject matter.

At block 2201, which may be performed as a subroutine, a continuation interpreted program is executed in a coroutine execution context. An example of a method of executing a continuation interpreted program in a coroutine execution context is illustrated and discussed in relation to FIG. 23, coroutine execution context module 2300.

At decision block 2202, a determination is made as to whether the continuation interpreted program executed in a coroutine execution context is completed or has yielded its execution.

If the continuation is completed at decision block 2202, then continuation execution module continues at block 2203 to decrement a continuation reference count (as may have been incremented in, for example, user task execution module 1900).

If the continuation is yielded at decision block 2202, then continuation execution module 2200 may return back to, for example, a main subroutine of execution fabric thread subroutine 1800 in order to execute other tasks in priority order from unblocked task streams.

At decision block 2204, a determination may be made as to whether a continuation reference count is 0.

If the continuation reference count is 0 at decision block 2204, then continuation execution module 2200 continues at block 2205 to release the coroutine execution context. Releasing the coroutine may be accomplished by disposing the coroutine execution context, or it may be accomplished by storing the coroutine execution context into a cache.

At block 2206, continuation execution module 2200 unblocks a user task stream that has the same task key value as a user task being executed.

If the continuation reference count is not 0 at decision block 2204, then continuation execution module 2200 continues at decision block 2207. At decision block 2207, a determination may be made as to whether there exist any deferred continuation interpreted programs.

If there are any deferred continuation interpreted programs at decision block 2207, then continuation execution module 2200 continues at block 2208 to dequeue a continuation interpreted program from a deferred continuation first in first out linked list (examples of which are illustrated and discussed in relation to FIG. 11 and FIG. 12).

Continuation execution module 2200 may proceed to loop back to block 2201 to execute the dequeued continuation interpreted program.

Figure 23:
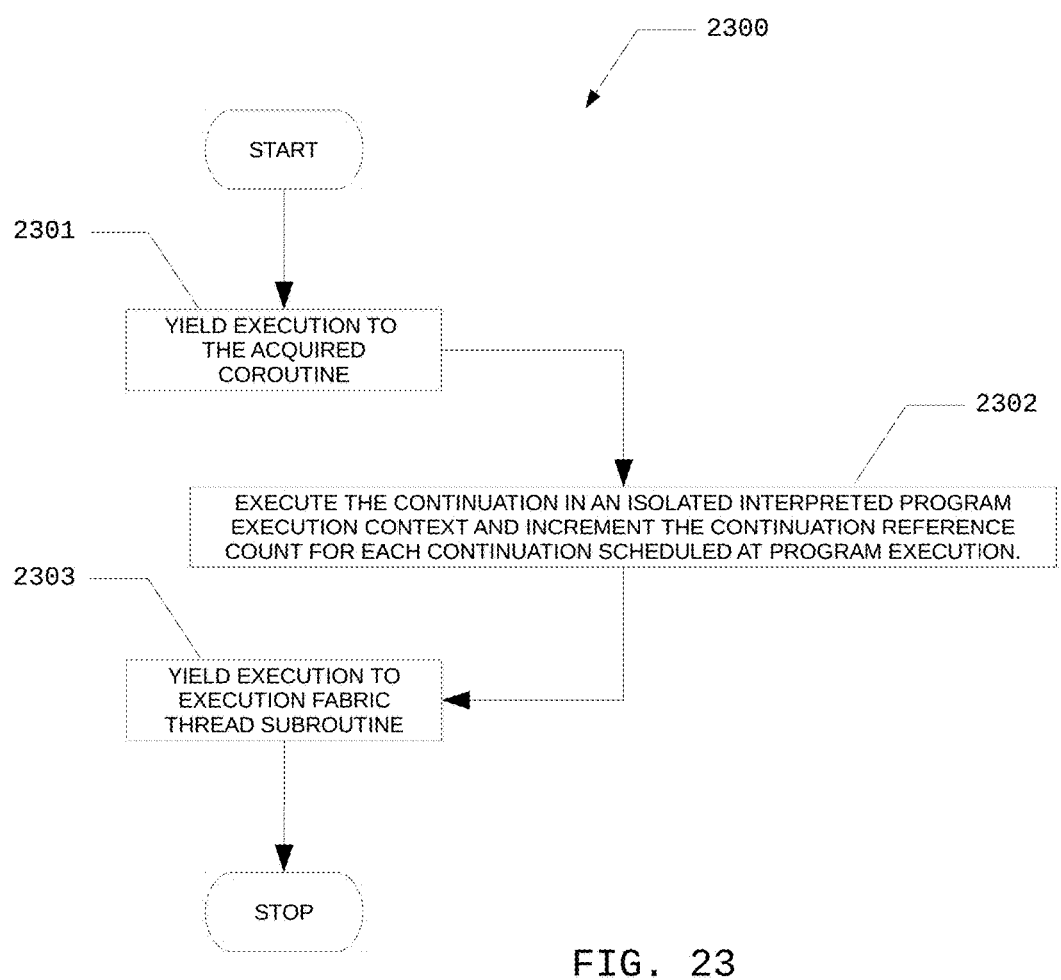
FIG. 23 is a flow chart illustrating an example of a method of execution of a continuation interpreted program in a coroutine execution context in accordance with a runtime environment aspect of the claimed subject matter.

FIG. 23 is a flow chart illustrating an example of a method performed by a coroutine execution context module 2300 to execute a continuation interpreted program in accordance with a runtime environment aspect of the claimed subject matter.

At block numeral 2301, coroutine execution context module 2300 yields execution to an acquired coroutine to start the execution of a continuation interpreted program. At block 2302, coroutine execution context module 2300 executes the continuation interpreted program in an isolated interpreted program execution context and increments a continuation reference count for each continuation interpreted program scheduled at program execution.

At block 2303, coroutine execution context module 2300 continues to yield the execution to a main subroutine of an execution fabric thread.

The runtime environment aspect of the subject matter implements a generic multiple producer single consumer queue and utilizes it as an embodiment of private task queue. The generic multiple producer single consumer queue maintains 2 linked lists; a producer linked list and a consumer linked list. The producer linked list is shared among multiple producers; multiple producers concurrently enqueue produced nodes into the producer linked list. Consumer linked list is only accessed by the consumer; the consumer dequeues nodes from it.

When the generic multiple producer single consumer queue is created, both producer and consumer linked lists are empty. As producers push nodes, producer linked list grows. When the consumer dequeues a node, an empty consumer linked list and the producer linked list is swapped. New producer linked list keeps growing and the consumer queue is accessed by the consumer thread only for dequeuing the existing nodes from it. When the consume linked list becomes empty again, an empty consumer linked list and the producer linked list is swapped again. This way, only a single atomic instruction is used to swap the producer linked list, which contains all the produced nodes between swaps, with the empty consumer linked list. The rest of the consumer dequeue operations do not require atomic CPU operations. This method drastically reduces the atomic CPU instructions needed to consume the produced nodes especially when there exists fast producers, which drastically reduces the CPU contention during concurrent queue operations.

An embodiment of generic multiple producer single consumer queue comprises a head pointer, a tail pointer, and may further comprise queue nodes. Every node in generic multiple producer single consumer queue comprises a pointer to the next node. The head pointer points to the beginning of the consumer linked list, and it is used to dequeue the produced nodes from the consumer linked list without using any synchronization mechanism. The tail pointer points to the end of the producer linked list and it is used to enqueue new nodes into the producer linked list concurrently with atomic operations. The next pointer of the sink node points to the beginning of the producer linked list, and it is used to atomically swap the beginning of the producer linked list with the beginning of the consumer linked list. It also marks the end of the consumer linked list.

Figure 24:
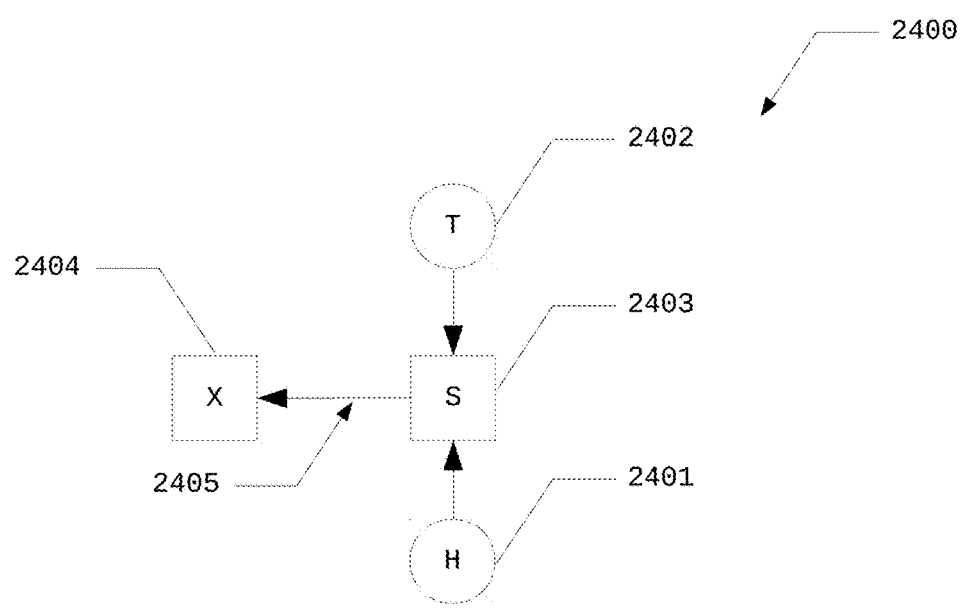
FIG. 24 is a block diagram of an example of an empty producer linked list structure and empty consumer linked list structure of a generic multiple producer single consumer queue in accordance with a runtime environment aspect of the claimed subject matter.

FIG. 24 is a block diagram of empty producer linked list structure and empty consumer linked list structure of a generic multiple producer single consumer queue in accordance with a runtime environment aspect of the claimed subject matter. The end of the producer linked list is marked by the terminator 2404. The next pointer of the sink node 2403 pointing 2405 to the terminator 2404 indicates an empty producer linked list. The end of the consumer linked list is marked by pointing to the sink node 2403. Head pointer 2401 pointing to the sink node 2403 indicates an empty consumer linked list. When a generic multiple producer single consumer queue is initialized, the producer linked list is empty, the consumer linked list is empty, and the tail pointer 2402 points to the sink node.

Figure 25:
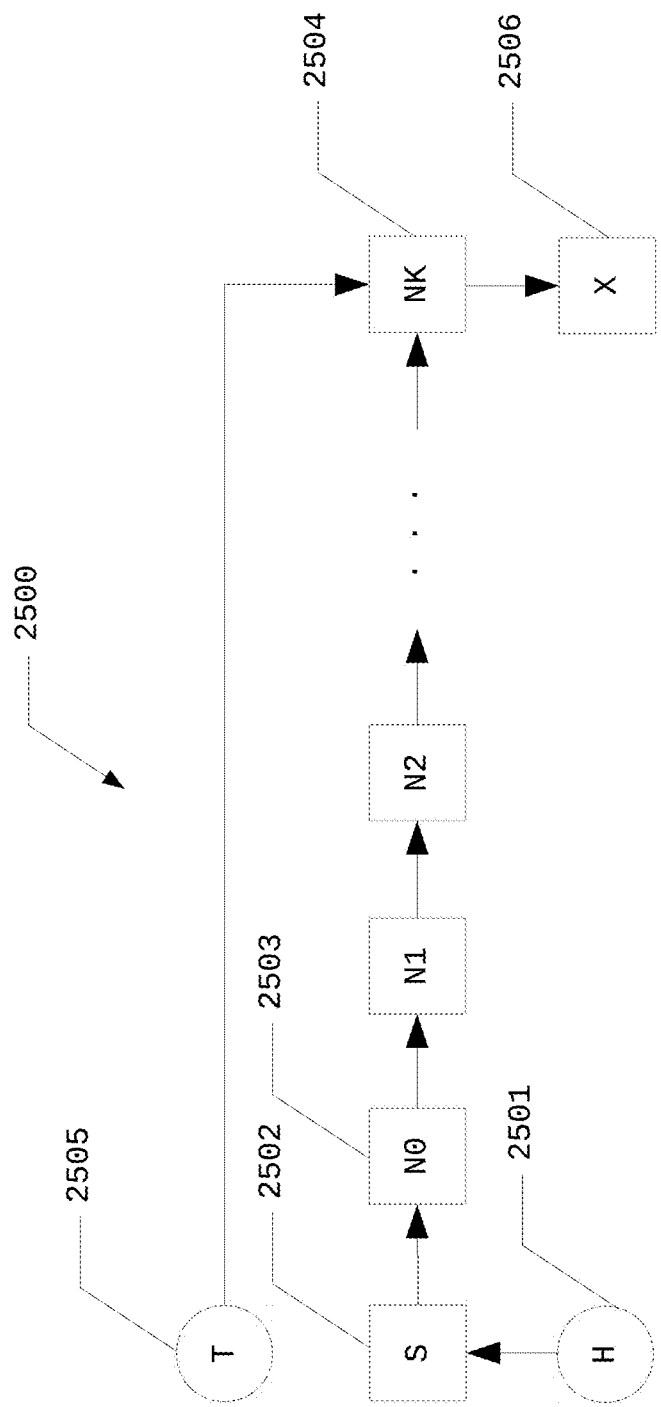
FIG. 25 is a block diagram of an example of a non-empty producer linked list structure and empty consumer linked list structure of a generic multiple producer single consumer queue in accordance with a runtime environment aspect of the claimed subject matter.

FIG. 25 is a block diagram of non-empty producer linked list structure and empty consumer linked list structure of a generic multiple producer single consumer queue in accordance with a runtime environment aspect of the claimed subject matter. The next pointer of the sink node 2502 points to the first queue node 2503 of the producer linked list. The tail pointer 2505 pointing the last queue node 2504 in the producer linked list which is terminated 2506. The head pointer 2501 is pointing to the sink node 2502 is indicating an empty consumer linked list.

Figure 26:
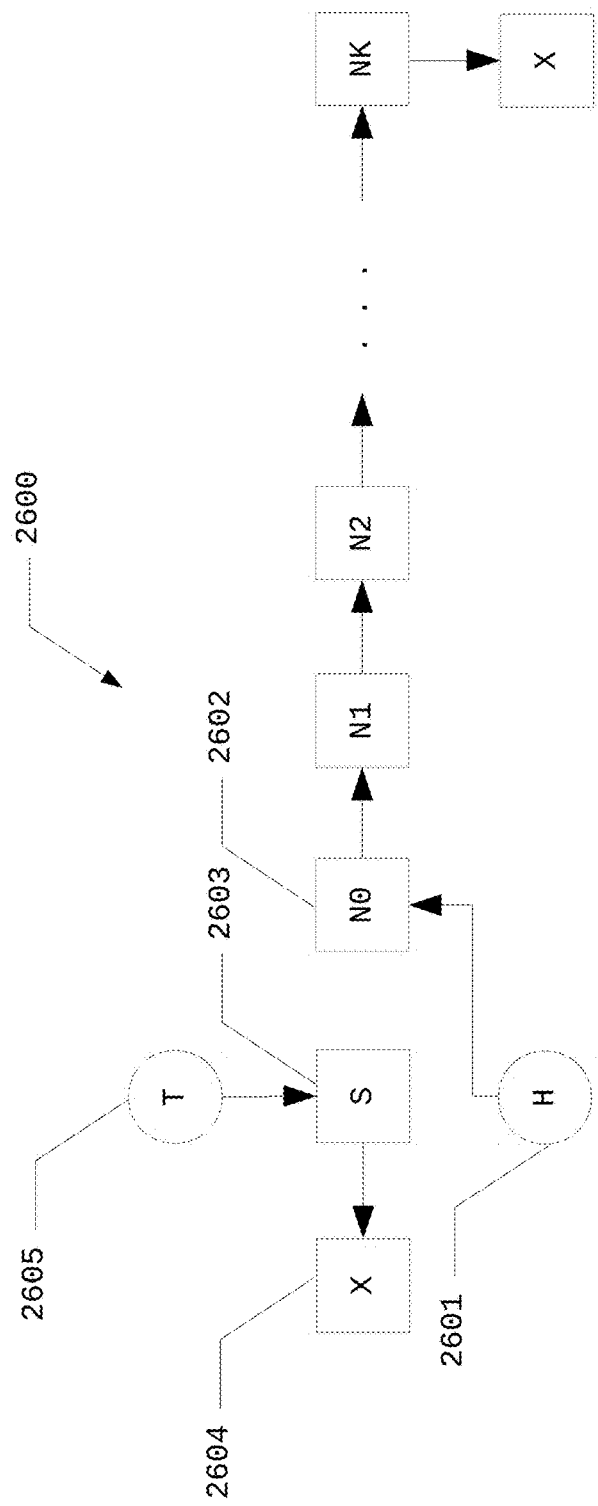
FIG. 26 is a block diagram of an example of a generic multiple producer single consumer queue after producer linked list swapped with an empty consumer linked list structure in accordance with a runtime environment aspect of the claimed subject matter.

FIG. 26 is a block diagram of a generic multiple producer single consumer queue after producer linked list swapped with an empty consumer linked list structure 2600 in accordance with a runtime environment aspect of the claimed subject matter. The head pointer 2601 points to the first queue node of the consumer linked list. The tail pointer 2605 points to the sink node 2603 to grow new producer linked list. The next pointer of the sink node 2603 points to a terminator to indicate an empty producer linked list.

Figure 27:
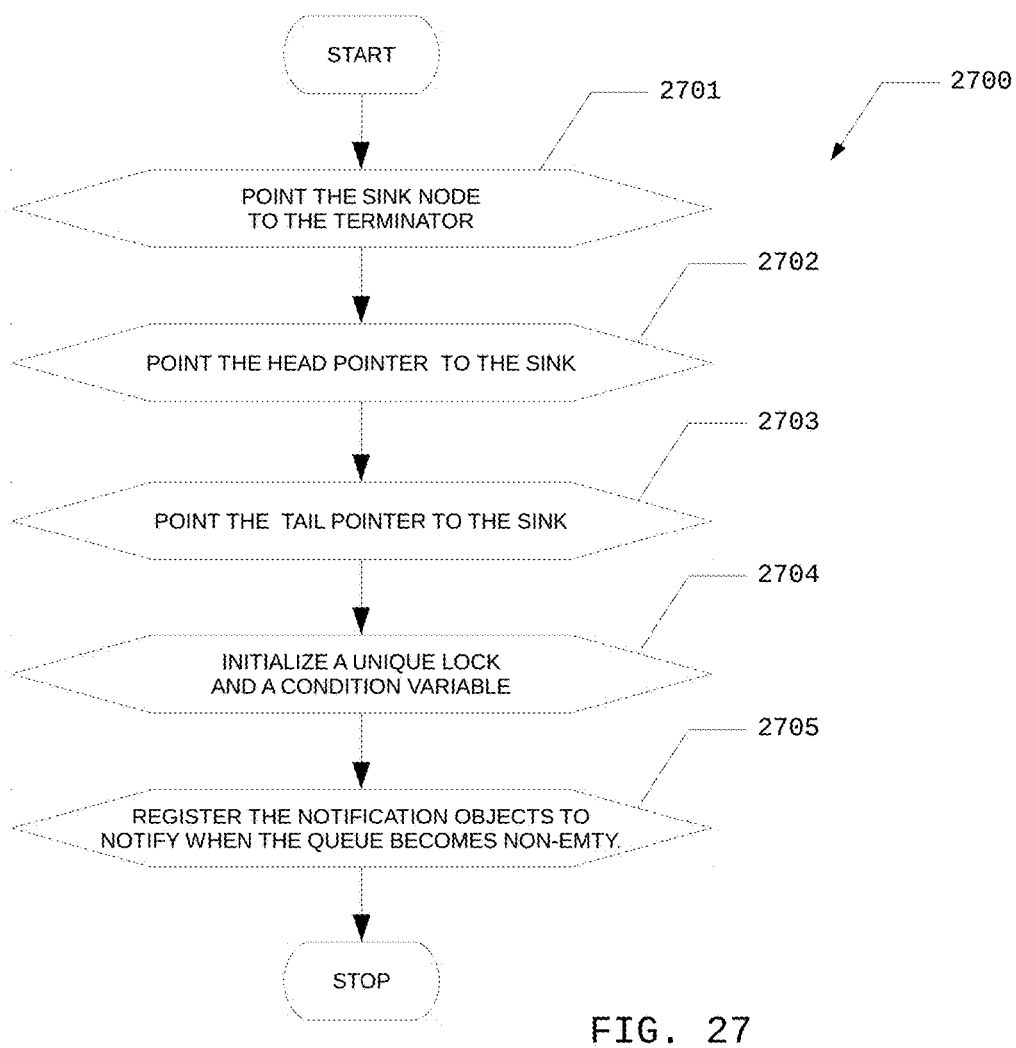
FIG. 27 is a flow chart of an example of initialization of a generic multiple producer single consumer queue in accordance with a runtime environment aspect of the claimed subject matter.

FIG. 27 is a flow chart of an example of an initialization of a generic multiple producer single consumer queue 2700 in accordance with a runtime environment aspect of the claimed subject matter. At reference numeral 2701, the sink node is terminated. At reference numeral 2702, the head pointer is pointed to the sink node. At reference numeral 2703, the tail pointer is pointed to the sink node. At reference numeral 2704, the unique lock, which is a mutually exclusive loch, and the condition variable of the queue are initialized. The unique lock and the condition variable are used to block the consumer thread as long as there is nothing to consume, and used to wake the consumer thread up when there is at least one node to consume. At reference numeral 2705, the notification objects are registered in order to notify it when the generic multiple producer single consumer queue becomes non-empty. Notification objects are signaled to notify registrars to notify when there is at least one node to consume.

Figure 28:
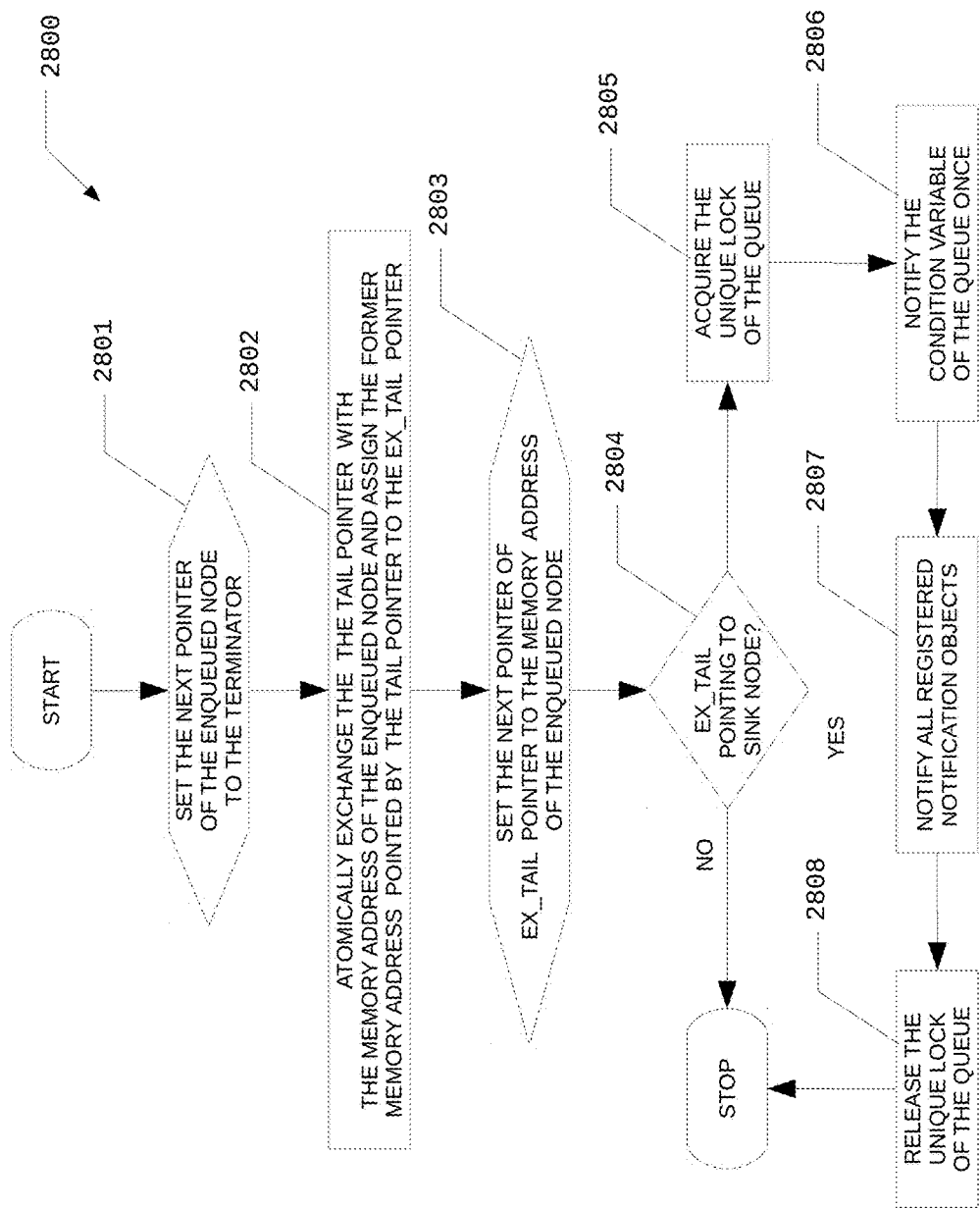
FIG. 28 is a flow chart of an example of enqueuing a queue node into a generic multiple producer single consumer queue in accordance with a runtime environment aspect of the claimed subject matter.

FIG. 28 is a flow chart of an example of enqueuing a queue node into a generic multiple producer single consumer queue 2800 in accordance with a runtime environment aspect of the claimed subject matter. At reference numeral 2801, the next pointer of the enqueues queue node is set to the terminator. The method continues at numeral 2802 to atomically exchange the tail pointer with the memory address of the enqueued node and assign the former memory address pointed by the tail pointer to an ex_tail pointer created in the stack of the program thread execution. At reference numeral 2803, the next pointer of the ex_tail variable is set to the memory address of the enqueued node. At numeral 2804, a determination is made as to weather the ex_tail is pointing to the sink node. If the ex_tail is pointing to the sink node at numeral 2804, then the method acquires the unique lock of the queue at numeral 2805. If the ex_tail is not pointing to the sink node at numeral 2804, then the method returns. At numeral 2806 the condition variable of the queue is notified once. Then at reference numeral 2807, all registered notification objects are notified. At reference numeral 2808, the unique lock of the queue is released.

Figure 29:
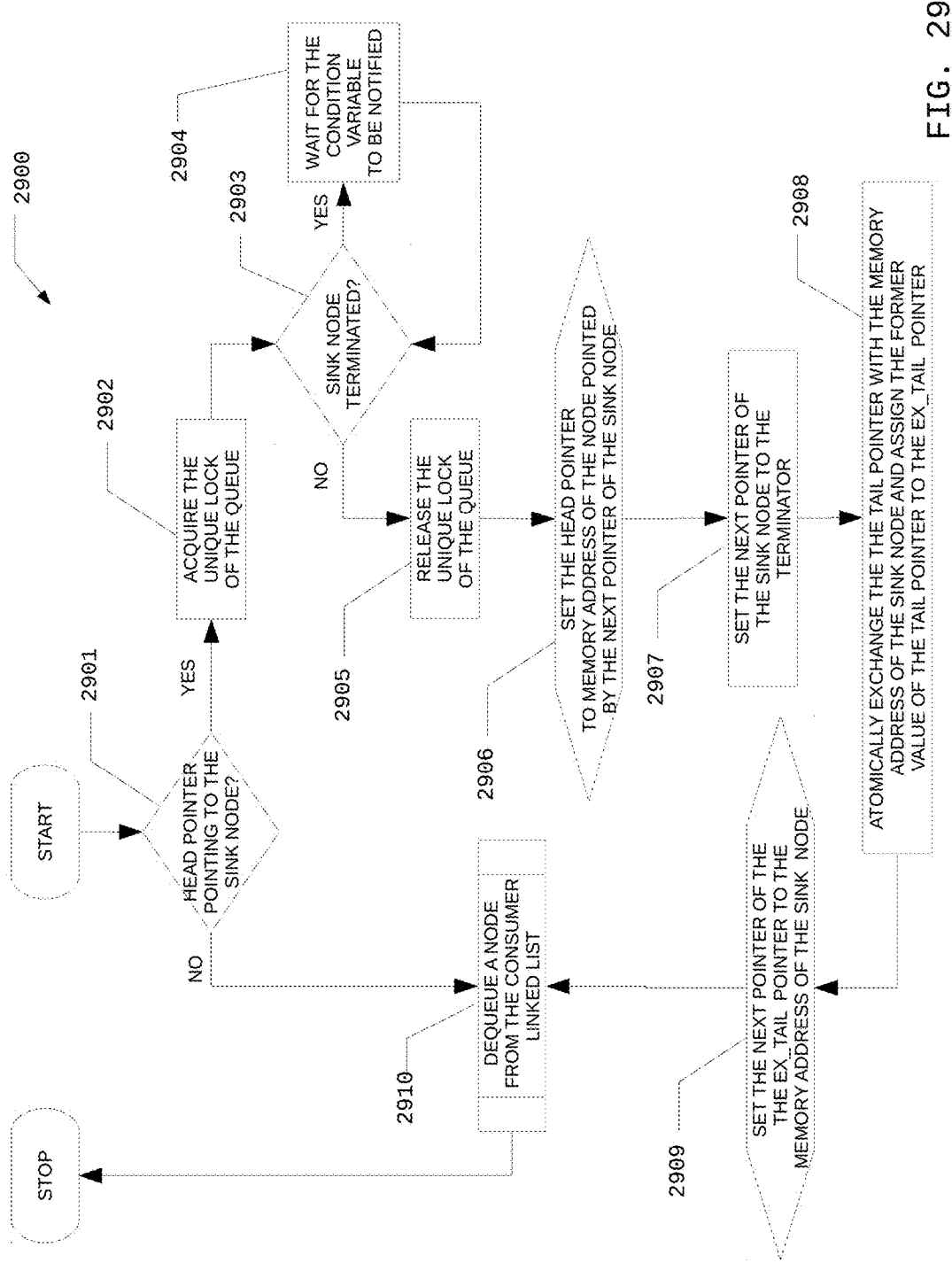
FIG. 29 is a flow chart of an example of dequeueing a queue node from a generic multiple producer single consumer queue in accordance with a runtime environment aspect of the claimed subject matter.

FIG. 29 is a flow chart of an example of dequeueing a queue node from a generic multiple producer single consumer queue 2900 in accordance with a runtime environment aspect of the claimed subject matter. At reference numeral 2901, a determination is made as to weather the head pointer is pointing to the sink node. If the head pointer is pointing to the sink node at numeral 2901, which means consumer linked list is empty and needs to be swapped with the producer linked list, the method acquires the unique lock of the queue to block the consumer queue at numeral 2902. At numeral 2903, a determination is made as to weather the sink node is terminated. If the sink node is terminated at reference 2903, then the method waits for the condition variable to be notified at numeral 2904. The method then proceeds to loop back to reference numeral 2903 where a determination is made as to weather the sink node is terminated. If the sink node is not terminated at reference 2903, then the method continues at numeral 2905 to release the unique lock of the queue. At numeral 2906, the method points the head pointer to the node pointed by the next pointer of the sink node. The method continues at numeral 2907 to set the next pointer of the sink node to the terminator. At numeral 2908, the method atomically exchanges the tail pointer with the address of the sink node, and assigns the former memory address of the tail node to the ex_tail variable. The method continues at numeral 2909 to set the next potter of the ex_tail variable to the memory address of the sink node. At numeral 2910, the method dequeues a node from the consumer linked list. If the head node is not pointing to the sink node at numeral 2901, then the method dequeues a node from the consumer linked list. Method of dequeueing a node from the consumer linked list 3000 is depicted in FIG. 30.

Figure 30:
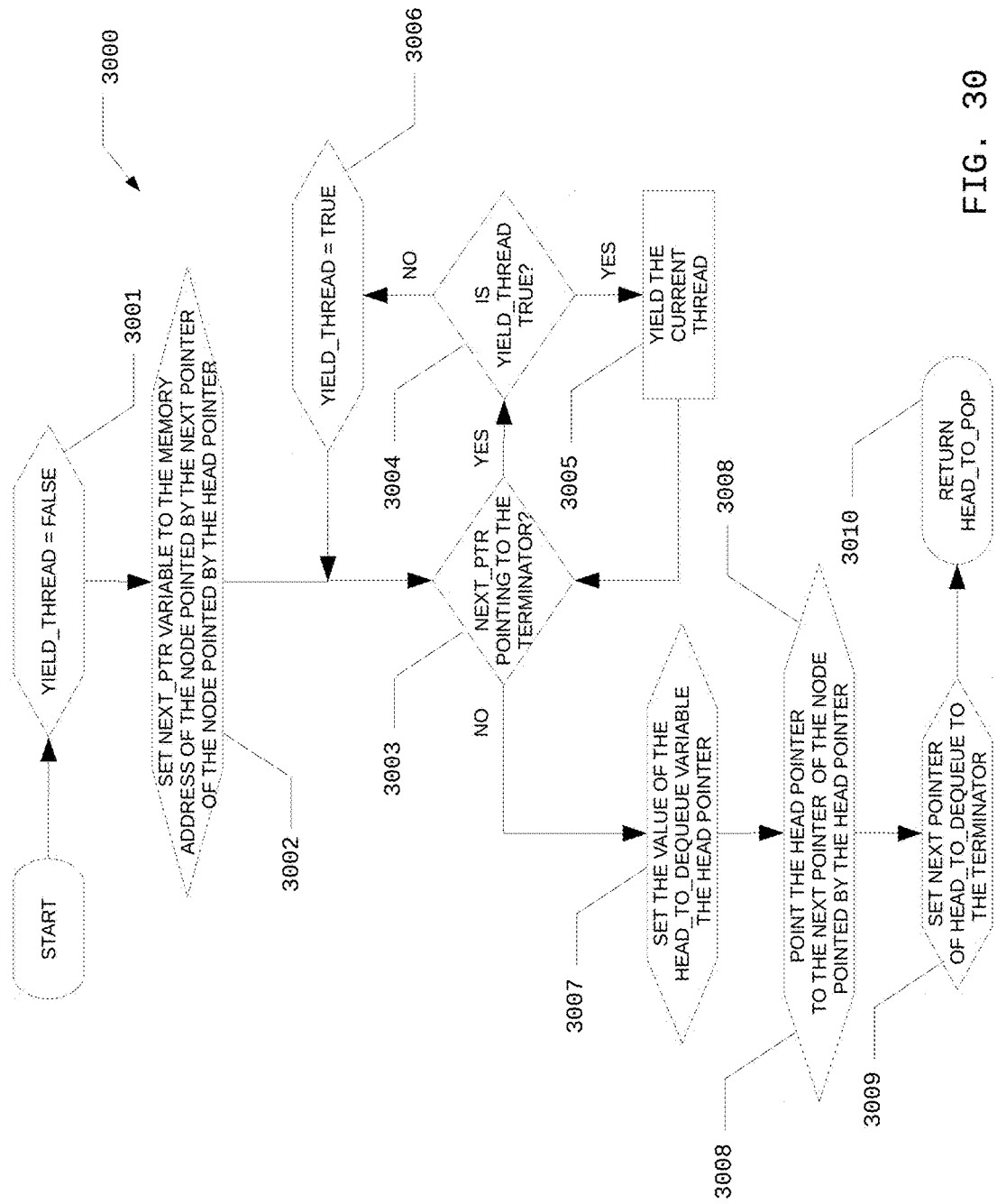
FIG. 30 is a flow chart of an example of dequeueing a queue node from a consumer linked list of a generic multiple producer single consumer queue in accordance with a runtime environment aspect of the claimed subject matter.

FIG. 30 is a flow chart of an example of dequeueing a queue node from the consumer linked list of a generic multiple producer single consumer queue 3000 in accordance with a runtime environment aspect of the claimed subject matter. At numeral 3001, the value of the yield_thread flag which is created in the stack is set to false. At numeral 3002, the value of the next_ptr variable is set to the memory address of the mode pointed by the next pointer of the node pointed by the head pointer. At numeral 3003, a determination is made as to weather the next_ptr is pointing to the terminator. If the next_ptr is pointing to the terminator at numeral 3003, the method continues at numeral 3004 to make a determination as to weather the value of the yield_thread flag is true. If the value of the yield_thread flag is true at numeral 3004, then the method yields execution to another thread at numeral 3005, and proceeds to loop back to the numeral 3003. If the value of the yield_thread flag is false at numeral 3004, then the method proceed to numeral 3006 to set the value of the yield_thread flag to true, and proceeds to loop back to the numeral 3003. If the next_ptr is not pointing to the terminator at numeral 3003, then the method continues at numeral 3007 to set the value of the head_to_dequeue variable to the memory address of the head node. At numeral 3008, the method points the head pointer to the next pointer value of the node pointed by the head pointer. At reference numeral 3009, the next pointer of the head_to_dequeue is set to the terminator. At reference numeral 3010, the value of the head_to_dequeue, which is the node to be dequeued, is returned.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

Following are examples of embodiments disclosed herein:

In a first set of the examples below, sub-examples are arranged hierarchically, with hierarchical levels arranged according to the following structure: Example 1.A.1)a)i)aa).

In the first set of examples listed below, each sub-level may be an example according to an example of any level above such sub-level; examples from different sub-levels and across examples may be combined.

Following is a first set of examples of systems, methods, apparatuses and computer-readable media pertaining to programming model and interpreted runtime environment for high performance services with implicit concurrency control comprising:

EXAMPLE 1

A programming model comprises a computer program service definition; an interpreted language; a concurrency control configuration; and a behavior definition, A. wherein the concurrency control configuration comprises concurrency control type and initial semaphore count;

1) wherein the concurrency control type is no concurrency control, mutually exclusive concurrency control, semaphore concurrency control, or readers-writers concurrency control;

B. wherein the behavior definition comprises a continuation function; and an operation type, 1) wherein the continuation function comprises at least one program instruction written in the interpreted language in continuation passing style (CPS) or direct style (DS), 2) wherein the operation type is read or write, C. wherein the computer program service definition comprises a service name; a computer program unit definition; a service configuration; and the behavior definition, 1) wherein the service name is unique among the service names of the computer program service definitions, 2) wherein the computer program unit definition form a tree of the computer program unit definitions, 3) wherein the computer program unit definition comprises a unit name; a unit definition key; a unit configuration; and the behavior definition, a) wherein the unit name is unique among its sibling unit names of the computer program unit definitions in the definition tree of the computer program unit definitions, b) wherein the unit definition key is globally unique, c) wherein the unit configuration comprises the concurrency control configuration; and a multiton flag, 4) wherein the service configuration comprises a tree information of the tree of the computer program unit definition; and the concurrency control configuration;

a) wherein each tree node of the tree information comprises the unit name and the unit definition key of the computer program unit definition.

D. wherein each computer program service definition is stored on storage medium which is accessible with the service name;

1) wherein each computer program unit definition is accessible with the unit definition key.

EXAMPLE 2

A system, method, apparatus and computer-readable media of a runtime environment comprises a computer program service instance; a task; an implicit promise function; an implicit future variable; and a runtime environment process, A. wherein the computer program service instance is an instance of the computer program service definition, B. wherein the computer program service instance comprises a service instance data, which is processed in computer system memory and stored in computer storage medium; and a computer program unit instance, 1) wherein the service instance data comprises the service name; and a service instance operational data, a) wherein the service instance operational data comprises an unordered collection of key/value pairs where the keys are strings; and an ordered list of zero or more values, each of which may be of any data type.

2) wherein the computer program unit instance is an instance of the computer program unit definition, 3) wherein the computer program unit definition is allowed to have more than one corresponding computer program unit instance when the multiton flag of the unit configuration of the computer program unit definition is set, 4) wherein the computer program unit instance form a tree of the computer program unit instances, 5) wherein the computer program unit instance comprises a unit instance data, which is processed in computer system memory and stored in computer storage medium, a) wherein the unit instance data comprises the service name; the unit definition key; a unit instance key; a list topology of ascendant computer program unit instance; and a unit instance operational data, i) wherein the unit instance key is globally unique, ii) wherein the unit instance operational data comprises an unordered collection of key/value pairs where the keys are strings; and an ordered list of zero or more values, each of which may be of any data type.

iii) wherein each node of the list topology of ascendant computer program unit instance comprises the unit definition key; and the unit instance key C. wherein the task comprises at least one of a task operation; a task priority; a task key; an argument; a continuation reference count; and a coroutine execution context, 1) wherein the task operation comprises at least one of creation of the computer program service instance corresponding to the service name; creation of the computer program unit instance for the unit instance key generated by the runtime environment process; deletion of the computer program service instance indicated by the service name; deletion of the computer program unit instance indicated by the unit instance key; execution of the continuation function of the computer program service definition indicated by the service name; execution of the continuation function of the computer program unit definition on the computer program unit instance indicated by the unit instance key; execution of the implicit promise function; resolving the value of the future variable; and restoring the coroutine execution context;

2) wherein the task operation is executed with the argument in the coroutine execution context of the task.

3) wherein the service instance operational data and the unit instance operational data are manipulated during execution of the task operation, 4) wherein the task key is the service name for the task operation executed on the computer program service instance, and the task key is the unit instance key for the task operation executed on the computer program unit instance, 5) wherein execution of each continuation function passed as an argument to a CPS style function during the execution of each continuation function is invoked with another task that is enqueued into the same task queue of the same thread as the top level continuation function is executed on, 6) wherein the continuation reference count is used to count the number of outstanding continuations, which is initialized to 0 at the creation of the task, a) wherein the continuation reference count is incremented for each created the task to invoke the continuation function including the top level continuation function, b) wherein the continuation reference count is decremented at the completion of each continuation function, 7) wherein the task priority is one of a system level priority or a natural number starting after maximum system level priority and monotonically increased for each task by the runtime environment process where smaller numbers take precedence, D. wherein the runtime environment process comprises a fabric; a program interpreter, 1) wherein the program interpreter compiles and executes the continuation function, 2) wherein the fabric comprises a thread, a) wherein the thread comprises a thread index; a task queue; a task stream; a priority queue; a hash function; and a subroutine, i) wherein each thread is identified by the thread index starting from 0 and incremented for each thread in each fabric.

ii) wherein the task queue is a multiple producer and single consumer first in first out queue of the task to concurrently enqueue each task from at least one thread and to concurrently dequeue each task from an owning thread, iii) wherein the task stream comprises a linked list of the task; and at least one of a task stream priority, a task stream key, and a concurrency count;

aa) wherein the task stream priority is the task priority of the task at the head of the linked list of the task, ab) wherein each task of task stream have the same task key which is equal to the task stream key.

ac) wherein the task stream further comprises a blocked flag, bb) wherein the task stream with the blocked flag set is removed from task prioritization and no task is executed from the task stream until the blocked flag is unset, iv) wherein the priority queue is a priority queue of the task stream where they are prioritized based on the task stream priority, v) wherein the subroutine comprises a task execution process; and a task execution process loop of the task execution process, vi) wherein the coroutine execution context allows the task operation to yield execution to the task execution process for the task execution process to continue its execution process, vii) wherein a restoration of the coroutine execution context allows the task operation to continue its execution from the instruction it yielded from, 3) wherein the hash function returns same the thread index each time it is executed with same the task key for the same fabric, F. wherein the implicit promise function and the implicit future variable provide implicit concurrency to execution of the continuation function written in the interpreted language in DS, 1) wherein each time the implicit promise function is called, new task is created to execute the promise function, and associated with new implicit future variable created as a return value to the implicit promise function call, 2) wherein each time the continuation function accesses the value of the unresolved future variable, the continuation function executing in the coroutine execution context implicitly yields execution to the subroutine, 3) wherein new the task created to execute the promise function executes the promise function concurrently on a the thread before it is finally executed to resolve the value of the future variable and perform the restoration of the yielded coroutine execution context to continue from the instruction it yielded from on the thread where the continuation function is executed for the continuation function,

EXAMPLE 3

A runtime environment as in example 2 and/or any other example herein, wherein the runtime environment process further comprises an implicit concurrency control method for execution of the task operation of the tasks on the computer program unit instance and the computer program service instance, A. The method of example 3 and/or any other example herein, wherein each task is enqueued into the task queue of the thread whose thread index is calculated by executing the hash function with the task key for the fabric, B. The method of example 3 and/or any other example herein, wherein the task execution process comprises a first concurrency control decision process that utilizes at least one of the task, the task stream, the concurrency control configuration, the operation type, the continuation reference count, and the concurrency control count to determine as to weather execution of further task operations on the computer service instance or the computer program unit instance to be prevented and the task operation to be executed; and a second concurrency control decision process that utilizes the concurrency control configuration, the task operation, the continuation reference count, and the concurrency control count to determine as to weather execution of further task operations on the computer program service instance or the computer program unit instance to be allowed, C. The method of example 3 and/or any other example herein, wherein the task execution process comprises steps of 1) dequeuing every existing task from the task queue and enqueueing each dequeued task into the task stream of the priority queue where the task key is equal to the task stream key, 2) finding a highest priority task stream in the priority queue, 3) employing the first concurrency control decision process a) if the first concurrency control decision process determines to block execution of further task operations on the computer service instance or the computer program unit instance, then the blocked flag of the highest priority task stream is set, b) if the first concurrency control decision process determines to execute the task operation of head the task from the highest priority task stream, then head the task from the highest priority task stream is dequeued and its task operation is executed 4) employing the second concurrency control decision process, a) if the concurrency control decision process determines to unblock execution of further task operations on the computer program unit instance, then the blocked flag of the highest priority task stream is reset, 5) reiterating the task execution process loop.

Following is a second set of examples:

EXAMPLE 1

A method of computing to provide implicit concurrency control with respect to user operations of program unit instances, the method comprising: with a runtime environment process, executing a system operation on a thread based on a first priority and executing a user operation of a program unit instance on a thread based on a second priority; wherein the user operation comprises an identifier of the thread, and an identifier of the program unit instance, wherein the identifier of the thread is derived from the identifier of the program unit instance, and wherein the user operation is executed on the thread indicated by the identifier of the thread; wherein the thread comprises a stream of user operations, and wherein the stream of user operations comprises the user operation and only user operations comprising the identifier of the program unit instance; determining whether to block at least a second user operation of the program unit instance and the stream of user operations during the execution of the user operation; while the stream of user operations is blocked, executing at least one of system operations or other user operations from unblocked streams of user operations based on a priority of system operations and of the other user operations.

EXAMPLE 2

The method according to Example 1, wherein the program unit instance is an instance of a program unit definition, wherein the program unit definition comprises a behavior specified in an interpreted language in at least one of a continuation passing style (CPS) or a direct style (DS) in a continuation function.

EXAMPLE 3

The method according to Example 1, wherein the runtime environment comprises an interpreter and, with the interpreter, performing an execution of a continuation function of a behavior of the program unit instance.

EXAMPLE 4

The method according to Example 3, wherein the continuation function is a first continuation function and wherein performing the execution of the continuation function of the behavior of the program unit instance comprises one of an execution of the first continuation function and an execution of the first continuation function and at least a second continuation function of the first continuation function.

EXAMPLE 5

The method according to Example 1, wherein executing the user operation of the program unit instance on the thread is in a coroutine execution context, wherein the coroutine execution context allows the execution of the user operation to yield execution to a subroutine of the thread and wherein the subroutine executes system operations and user operations of program unit instances from unblocked streams of user operations based on priority, wherein the coroutine execution context restores a previously yielded user operation of the program unit instance to complete the execution of the user operation.

EXAMPLE 6

The method according to Example 2, wherein the user operation of the program unit instance comprises at least one of a creation of the program unit instance, a deletion of the program unit instance, an execution of the behavior, and wherein the execution of the behavior comprises an execution of a continuation function, and wherein the system operation comprises at least one of an execution of an implicit promise function, a resolution of a value of an implicit future variable, and a restoration of a coroutine execution context.

EXAMPLE 7

The method according to Example 6, wherein the implicit promise function and the implicit promise future variable provide implicit concurrency to execution of the continuation function, wherein in response to an implicit promise function call, the implicit promise function is concurrently executed as the system operation on any thread and is associated with the implicit future variable, wherein the implicit future variable is returned as a value to the implicit promise function call, wherein each time the continuation function accesses the value of the implicit future variable when the value of the implicit future variable has not been resolved, the continuation function yields execution to a subroutine, wherein the value of the implicit future variable is resolved and the coroutine execution context is restored to proceed with the execution of the continuation function by execution of the system operation with a result of the execution of the implicit promise function on the thread that executes the continuation function.

EXAMPLE 8

The method according to at least one of Example 1 to Example 7, wherein determining whether to block at least the second user operation of the program unit instance comprises determining whether a concurrency control definition specifies a mutex, a semaphore with a semaphore count, or a readers-writers lock, and utilization of a corresponding concurrency control mechanism before and after the execution of the user operation of the program unit instance.

EXAMPLE 9

A computer apparatus to provide implicit concurrency control with respect to user operations of program unit instances, the apparatus comprising a computer processor and a memory, the memory comprising instructions that, when executed, configure the computer apparatus with a runtime environment, wherein the runtime environment is to: execute a system operation on a thread based on a first priority and execute a user operation of a program unit instance on a thread based on a second priority; wherein the user operation comprises an identifier of the thread, and an identifier of the program unit instance, wherein the identifier of the thread is derived from the identifier of the program unit instance, and wherein the user operation is executed on the thread indicated by the identifier of the thread; wherein the thread comprises a stream of user operations, and wherein the stream of user operations comprises the user operation and only user operations comprising the identifier of the program unit instance; determine whether to block at least a second user operation of the program unit instance and the stream of user operations during the execution of the user operation; while the stream of user operations is blocked, execute at least one of system operations or other user operations from unblocked streams of user operations based on a priority of system operations and of the other user operations.

EXAMPLE 10

The apparatus according to Example 9, wherein the program unit instance is an instance of a program unit definition, wherein the program unit definition comprises a behavior specified in an interpreted language in at least one of a continuation passing style (CPS) or a direct style (DS) in a continuation function.

EXAMPLE 11

The apparatus according to Example 9, wherein the runtime environment further comprises an interpreter and wherein the interpreter is to perform an execution of a continuation function of a behavior of the program unit instance.

EXAMPLE 12

The apparatus according to Example 11, wherein the continuation function is a first continuation function and wherein perform the execution of the continuation function of the behavior of the program unit instance comprises one of perform an execution of the first continuation function and perform an execution of the first continuation function and at least a second continuation function of the first continuation function.

EXAMPLE 13

The apparatus according to Example 9, wherein execute the user operation of the program unit instance on the thread comprises execute the user operation of the program unit instance in a coroutine execution context, wherein the coroutine execution context allows the execution of the user operation to yield execution to a subroutine of the thread and wherein the subroutine executes system operations and user operations of program unit instances from unblocked streams of user operations based on priority, wherein the coroutine execution context is to restore a previously yielded user operation of the program unit instance to complete the execution of the user operation.

EXAMPLE 14

The apparatus according to Example 10, wherein the user operation of the program unit instance comprises at least one of a creation of the program unit instance, a deletion of the program unit instance, an execution of the behavior, and wherein the execution of the behavior comprises an execution of a continuation function, and wherein the system operation comprises at least one of an execution of an implicit promise function, a resolution of a value of an implicit future variable, and a restoration of a coroutine execution context.

EXAMPLE 15

The apparatus according to Example 14, wherein the implicit promise function and the implicit promise future variable provide implicit concurrency to execution of the continuation function, wherein in response to an implicit promise function call, the implicit promise function is concurrently executed as the system operation on any thread and is associated with the implicit future variable, wherein the implicit future variable is returned as a value to the implicit promise function call, wherein each time the continuation function accesses the value of the implicit future variable when the value of the implicit future variable has not been resolved, the continuation function yields execution to a subroutine, wherein the value of the implicit future variable is resolved and the coroutine execution context is restored to proceed with the execution of the continuation function by execution of the system operation with a result of the execution of the implicit promise function on the thread that executes the continuation function.

EXAMPLE 16

The apparatus according to at least one of Example 9 to Example 15, wherein determine whether to block at least the second user operation of the program unit instance comprises determine whether a concurrency control definition specifies a mutex, a semaphore with a semaphore count, or a readers-writers lock, and utilize a corresponding concurrency control mechanism before and after the execution of the user operation of the program unit instance.

EXAMPLE 17

One or more computer-readable media comprising instructions that cause a computer device, in response to execution of the instructions by a processor of the computer device, to: with a runtime environment, execute a system operation on a thread based on a first priority and execute a user operation of a program unit instance on a thread based on a second priority; wherein the user operation comprises an identifier of the thread, and an identifier of the program unit instance, wherein the identifier of the thread is derived from the identifier of the program unit instance, and wherein the user operation is executed on the thread indicated by the identifier of the thread; wherein the thread comprises a stream of user operations, and wherein the stream of user operations comprises the user operation and only user operations comprising the identifier of the program unit instance; determine whether to block at least a second user operation of the program unit instance and the stream of user operations during the execution of the user operation; while the stream of user operations is blocked, execute at least one of system operations or other user operations from unblocked streams of user operations based on a priority of system operations and of the other user operations.

EXAMPLE 18

The computer-readable media according to Example 17, wherein the program unit instance is an instance of a program unit definition, wherein the program unit definition comprises a behavior specified in an interpreted language in at least one of a continuation passing style (CPS) or a direct style (DS) in a continuation function.

EXAMPLE 19

The computer-readable media according to Example 17, wherein the runtime environment further comprises an interpreter and wherein the interpreter is to perform an execution of a continuation function of a behavior of the program unit instance.

EXAMPLE 20

The computer-readable media according to Example 19, wherein the continuation function is a first continuation function and wherein perform the execution of the continuation function of the behavior of the program unit instance comprises one of perform an execution of the first continuation function and perform an execution of the first continuation function and at least a second continuation function of the first continuation function.

EXAMPLE 21

The computer-readable media according to Example 17, wherein execute the user operation of the program unit instance on the thread comprises execute the user operation of the program unit instance in a coroutine execution context, wherein the coroutine execution context allows the execution of the user operation to yield execution to a subroutine of the thread and wherein the subroutine executes system operations and user operations of program unit instances from unblocked streams of user operations based on priority, wherein the coroutine execution context is to restore a previously yielded user operation of the program unit instance to complete the execution of the user operation.

EXAMPLE 22

The computer-readable media according to Example 18, wherein the user operation of the program unit instance comprises at least one of a creation of the program unit instance, a deletion of the program unit instance, an execution of the behavior, and wherein the execution of the behavior comprises an execution of the continuation function, and wherein the system operation comprises at least one of an execution of an implicit promise function, a resolution of a value of an implicit future variable, and a restoration of a coroutine execution context.

EXAMPLE 23

The computer-readable media according to Example 22, wherein the implicit promise function and the implicit promise future variable provide implicit concurrency to execution of the continuation function, wherein in response to an implicit promise function call, the implicit promise function is concurrently executed as the system operation on any thread and is associated with the implicit future variable, wherein the implicit future variable is returned as a value to the implicit promise function call, wherein each time the continuation function accesses the value of the implicit future variable when the value of the implicit future variable has not been resolved, the continuation function yields execution to a subroutine, wherein the value of the implicit future variable is resolved and the coroutine execution context is restored to proceed with the execution of the continuation function by execution of the system operation with a result of the execution of the implicit promise function on the thread that executes the continuation function.

EXAMPLE 24

The computer-readable media according to at least one of Example 17 to Example 23, wherein determine whether to block at least the second user operation of the program unit instance comprises determine whether a concurrency control definition specifies a mutex, a semaphore with a semaphore count, or a readers-writers lock, and utilize a corresponding concurrency control mechanism before and after the execution of the user operation of the program unit instance.

The invention claimed is:

1. A method of computing to provide implicit concurrency control, comprising:
within a runtime environment process, scheduling a task on a thread to execute an operation based on a priority on a program unit instance (PUI) of a program unit definition (PUD);
enqueueing the task into a task stream of the thread, wherein the PUI comprises an identifier, wherein the task stream comprises a flag, the identifier of the PUI, and a queue of tasks in a priority order each comprising the identifier of the PUI, and wherein the flag is set to "true" to mark the task stream as blocked, and set to "false" to mark the task stream as unblocked;
prioritizing the tasks located at the head of the queue of tasks of the task streams marked as unblocked in the thread; and
dequeuing and executing a highest priority task in the thread,
wherein executing the highest priority task in the thread includes:
applying a concurrency control algorithm corresponding to a concurrency control type of the PUD for the operation to determine whether to set the flag value of one or more task streams to "true";
executing the operation on the PUI; and
applying the concurrency control algorithm to determine whether to set the flag value of one or more task streams to "false".

2. The method of claim 1, wherein scheduling the task on the thread is indicated by mapping the identifier of the PUI to an identifier of the thread.

3. The method of claim 1, wherein the concurrency control type includes one of no concurrency control, mutual exclusion, semaphore or readers/writers lock, and wherein the corresponding concurrency control algorithm includes one of no concurrency control algorithm, mutual exclusion algorithm, semaphore algorithm or readers/writers lock algorithm.

4. The method of claim 1, wherein the PUI further includes a private state,
wherein the private state includes at least one of a memory state, a persisted state on a storage medium, a memory state on a remote computing unit, a persisted state on a storage medium on a remote computing unit, a state of an apparatus, or a state of a remote apparatus,
wherein the private state is accessed by the execution of the operation on the PUI, and wherein the remote computing unit is one of a physical computer, a virtual computer, a container, or an embedded computer.

5. The method of claim 1, wherein the operation includes at least one of creating the PUI of the PUD with a new identifier, executing a native function on the PUI, executing an interpreted function of the PUD on the PUI with an interpreter, deleting the PUI, further scheduling the task on a thread pool, or further scheduling the task on the thread indicated via mapping the identifier of the PUI to the identifier of the thread, and wherein the interpreted function includes an interpreted instruction specified in an interpreted language.

6. The method of claim 5, wherein the interpreted instruction is specified in either continuation-passing style (CPS) or direct-style (DS), wherein, if specified in CPS:

the interpreted instruction specified in CPS a call to a CPS function, wherein the CPS function takes an extra argument to an explicit continuation function, and wherein the explicit continuation function the interpreted instruction and is executed in the thread; and the execution of the operation comprising the execution of the interpreted function comprising the interpreted instruction specified in CPS completes upon the completion of the execution of the interpreted function and the completion of the execution of every explicit continuation function called during the execution of the operation in the thread.

7. The method of claim 5, further comprising executing the operation in a coroutine execution context.

8. The method of claim 7, further comprising, with an implicit promise function returning an implicit future value, providing implicit concurrency with implicit concurrency control to the execution of the operation in the coroutine execution context executing the interpreted function, wherein a call to the implicit promise function includes scheduling a concurrent execution of the implicit promise function, returning an unresolved implicit future value and proceeding with the execution of the operation in the coroutine execution context;

wherein the execution of the operation implicitly yields the execution to dequeue and execute the highest priority task in the thread at the execution of the interpreted instruction that accesses the unresolved implicit future value; and wherein the previously yielded execution of the operation is restored and the implicit future value is resolved with the completion of the concurrent execution of the implicit promise function.

9. An apparatus to provide implicit concurrency control within a runtime environment process, comprising:

at least one memory; and
at least one processor,
the at least one processor to:
schedule a task on a thread to execute an operation based on a priority on a program unit instance (PUI) of a program unit definition (PUD);
enqueue the task into a task stream of the thread, wherein the PUI includes an identifier, wherein the task stream includes a flag, the identifier of the PUI, and a queue of tasks in a priority order each comprising the identifier of the PUI, and wherein the flag is set to "true" to mark the task stream as blocked, and set to "false" to mark the task stream as unblocked;
prioritize the tasks located at the head of the queue of tasks of the task streams marked as unblocked in the thread; and
dequeue and execute a highest priority task in the thread,
wherein to execute the highest priority task in the thread includes to:
apply a concurrency control algorithm corresponding to a concurrency
control type of the PUD for the operation to determine whether to set the flag value of one or more task streams to "true";
execute the operation on the PUI; and
apply the concurrency control algorithm to determine whether to set the flag value of one or more task streams to "false".

10. The apparatus of claim 9, wherein the apparatus is further to schedule the task on the thread indicated via mapping the identifier of the PUI to an identifier of the thread.

11. The apparatus of claim 9, wherein the concurrency control type includes one of no concurrency control, mutual exclusion, semaphore or readers/writers lock, and wherein the corresponding concurrency control algorithm includes one of no concurrency control algorithm, mutual exclusion algorithm, semaphore algorithm or readers/writers lock algorithm.

12. The apparatus of claim 9, wherein the PUI further includes a private state, the private state including at least one of a memory state, a persisted state on a storage medium, a memory state on a remote computing unit, a persisted state on a storage medium on a remote computing unit, a state of an apparatus, or a state of a remote apparatus, wherein the private state is accessed by the execution of the operation on the PUI, and wherein the remote computing unit is a physical computer, a virtual computer, a container, or an embedded computer.

13. The apparatus of claim 9, wherein the operation includes at least one of creating the PUI of the PUD with a new identifier, executing a native function on the PUI, executing an interpreted function of the PUD on the PUI with an interpreter, deleting the PUI, further scheduling the task on a thread pool, or further scheduling the task on the thread indicated via mapping the identifier of the PUI to the identifier of the thread, and wherein the interpreted function includes an interpreted instruction specified in an interpreted language.

14. The apparatus of claim 13, wherein the interpreted instruction is specified in either continuation-passing style (CPS) or in direct-style (DS), and wherein, if specified in CPS:

the interpreted instruction includes a call to a CPS function, the CPS function takes an extra argument to an explicit continuation function, the explicit continuation function includes the interpreted instruction, and the apparatus is further to execute the explicit continuation function in the thread; and wherein the apparatus is further to:

complete the execution of the operation including the execution of the interpreted function including the interpreted instruction upon the completion of the execution of the interpreted function and the completion of the execution of every explicit continuation function called during the execution of the operation in the thread.

15. The apparatus of claim 13, wherein the apparatus is further to execute the operation in a coroutine execution context.

16. The apparatus of claim 15, wherein the apparatus is further to:
with an implicit promise function returning an implicit future value, provide implicit concurrency with implicit concurrency control to the execution of the operation in the coroutine execution context executing the interpreted function,
wherein a call to the implicit promise function includes to schedule a concurrent execution of the implicit promise function, return an unresolved implicit future value and proceed with the execution of the operation in the coroutine execution context;
wherein the execution of the operation implicitly yields the execution to dequeue and execute the highest priority task in the thread at the execution of the interpreted instruction that accesses the unresolved implicit future value; and
wherein the previously yielded execution of the operation is restored and the implicit future value is resolved with the completion of the concurrent execution of the implicit promise function.

17. A non-transitory computer-readable storage medium storing instructions that when executed by a computer cause the computer to provide implicit concurrency control to executions of operations over program unit instances of program unit definitions, including to:
within a runtime environment process, schedule a task on a thread to execute an operation based on a priority on a program unit instance (PUI) of a program unit definition (PUD);
enqueue the task into a task stream of the thread, wherein the PUI includes an identifier, wherein the task stream includes a flag, the identifier of the PUI, and a queue of tasks in a priority order each comprising the identifier of the PUI, and wherein the flag is set to "true" to mark the task stream as blocked, and set to "false" to mark the task stream as unblocked;
prioritize the tasks located at the head of the queue of tasks of the task streams marked as unblocked in the thread; and
dequeue and execute a highest priority task in the thread, wherein to execute the highest priority task in the thread includes:
apply a concurrency control algorithm corresponding to a concurrency control type of the PUD for the operation to determine
whether to set the flag value of one or more task streams to "true";
execute the operation on the PUI; and
apply the concurrency control algorithm to determine whether to set the flag value of one or more task streams to "false".

18. The non-transitory computer-readable storage medium of claim 17, wherein the instructions, when executed, further cause the computer to schedule the task on the thread indicated via mapping the identifier of the PUI to an identifier of the thread.

19. The non-transitory computer-readable storage medium of claim 17, wherein the concurrency control type includes one of no concurrency control, mutual exclusion, semaphore or readers/writers lock, and wherein the corresponding concurrency control algorithm includes one of no concurrency control algorithm, mutual exclusion algorithm, semaphore algorithm or readers/writers lock algorithm.

20. The non-transitory computer-readable storage medium of claim 17, wherein the PUI further includes a private state, wherein the private state includes at least one of a memory state, a persisted state on a storage medium, a memory state on a remote computing unit, a persisted state on a storage medium on a remote computing unit, a state of an apparatus, or a state of a remote apparatus;
wherein the private state is accessed by executing the operation on the PUI, and
wherein the remote computing unit is one of a physical computer, a virtual computer, a container, or an embedded computer.

21. The non-transitory computer-readable storage medium of claim 17, wherein the operation includes one of creating the PUI of the PUD with a new identifier, executing a native function on the PUI, executing an interpreted function of the PUD on the PUI with an interpreter, deleting the PUI, further scheduling the task on a thread pool, or further scheduling the task on the thread indicated via mapping the identifier of the PUI to the identifier of the thread, and
wherein the interpreted function includes an interpreted instruction specified in an interpreted language.

22. The non-transitory computer-readable storage medium of claim 21, wherein the interpreted instruction is specified in either continuation-passing style (CPS) or direct-style (DS),
wherein, if specified in CPS:
the interpreted instruction includes a call to a CPS function, the CPS function takes an extra argument to an explicit continuation function, the explicit continuation function includes the interpreted instruction, and the apparatus is further to execute the explicit continuation function in the thread; and
wherein, when executed, the instructions further cause the computer to:
complete the execution of the operation including the execution of the interpreted function including the interpreted instruction upon the completion of the execution of the interpreted function and the completion of the execution of every explicit continuation function called during the execution of the operation in the thread.

23. The non-transitory computer-readable storage medium of claim 21, wherein the instructions, when executed, further cause the computer to execute the operation in a coroutine execution context.

24. The non-transitory computer-readable storage medium of claim 23, wherein the instructions, when executed, further cause the computer to:
with an implicit promise function returning an implicit future value, provide implicit concurrency with implicit concurrency control to the execution of the operation in the coroutine execution context executing the interpreted function,
wherein a call to the implicit promise function includes to schedule a concurrent execution of the implicit promise function, return an unresolved implicit future value and proceed with the execution of the operation in the coroutine execution context;
wherein the execution of the operation implicitly yields the execution to dequeue and execute the highest priority task in the thread at the execution of the interpreted instruction that accesses the unresolved implicit future value; and wherein the previously yielded execution of the operation is restored and the implicit future value is resolved with the completion of the concurrent execution of the implicit promise function.

* * * * *

UNITED STATES PATENT AND TRADEMARK OFFICE
CERTIFICATE OF CORRECTION

Page 1 of 1

PATENT NO. : 10,310,820 B2
APPLICATION NO. : 15/592061
DATED : June 4, 2019
INVENTOR(S) : Ahmet Salih Iscen It is certified that error appears in the above-identified patent and that said Letters Patent is hereby corrected as shown below:

In the Claims

Column 39
Line 18, "... instruction specified in CPS a call" should read -- ... instruction specified in CPS is a call --
Line 21, "... explicit continuation function the" should read -- ... explicit continuation function is the --

Column 40
Line 63, "... interpreted instruction upon the completion of" should read -- ... interpreted instruction specified in the CPS upon the completion of --

Column 41
Line 46, "... includes:" should read -- includes to: --

Column 42
Line 35, "... the apparatus is further to execute" should read -- the stored instructions are further to execute --
Line 41, "... interpreted instruction upon the" should read -- interpreted instruction specified in the CPS upon the --

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*